US012579263B2

(12) United States Patent
Boehm et al.

(10) Patent No.: US 12,579,263 B2
(45) Date of Patent: Mar. 17, 2026

(54) PROTECTIVE ACTIONS FOR A MEMORY DEVICE BASED ON DETECTING AN ATTACK

(71) Applicant: Micron Technology, Inc., Boise, ID (US)

(72) Inventors: Aaron P. Boehm, Boise, ID (US); David Hulton, Seattle, WA (US); Jeremy Chritz, Seattle, WA (US); Tamara Schmitz, Scotts Valley, CA (US); Max S. Vohra, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 165 days.

(21) Appl. No.: 18/104,079

(22) Filed: Jan. 31, 2023

(65) Prior Publication Data

US 2023/0394143 A1 Dec. 7, 2023

Related U.S. Application Data

(60) Provisional application No. 63/347,861, filed on Jun. 1, 2022.

(51) Int. Cl.
*G06F 21/55* (2013.01)
*G06F 21/57* (2013.01)
*G06F 21/79* (2013.01)

(52) U.S. Cl.
CPC .......... *G06F 21/556* (2013.01); *G06F 21/575* (2013.01); *G06F 21/79* (2013.01)

(58) Field of Classification Search
CPC .............................. G06F 21/57; G06F 21/575
See application file for complete search history.

(56) References Cited

U.S. PATENT DOCUMENTS

| | | | | |
|---|---|---|---|---|
| 10,474,846 | B1 * | 11/2019 | Rezayee | ................. G07F 9/026 |
| 2016/0028386 | A1 * | 1/2016 | Lee | ........................... H03K 5/14 |
| | | | | 327/281 |
| 2017/0168902 | A1 * | 6/2017 | Branco | ................. G06F 21/554 |
| 2019/0325141 | A1 * | 10/2019 | Liew | ..................... G06F 21/575 |
| 2020/0210587 | A1 * | 7/2020 | Shi | ......................... G11C 29/24 |

FOREIGN PATENT DOCUMENTS

DE 102019127856 A1 * 4/2021

* cited by examiner

*Primary Examiner* — Daniel B Potratz
(74) *Attorney, Agent, or Firm* — Holland & Hart LLP

(57) ABSTRACT

Methods, systems, and devices for protective actions for a memory device based on detecting an attack are described. In some systems, a memory device may detect whether a fault is injected into the memory device. The memory device may apply a delay during boot up if a fault is detected. To ensure the delay is applied, the memory device may default to applying the delay and may remove an indication to apply the delay if a fault is not detected. Additionally or alternatively, the memory device may erase information from non-volatile memory during boot up, for example, if a fault is detected. The memory device may be configured to ensure at least a specific portion of memory resources (e.g., resources configured to store sensitive information) is erased during boot up. In some examples, the memory device may store data using a stream cipher to improve security of the data.

12 Claims, 11 Drawing Sheets

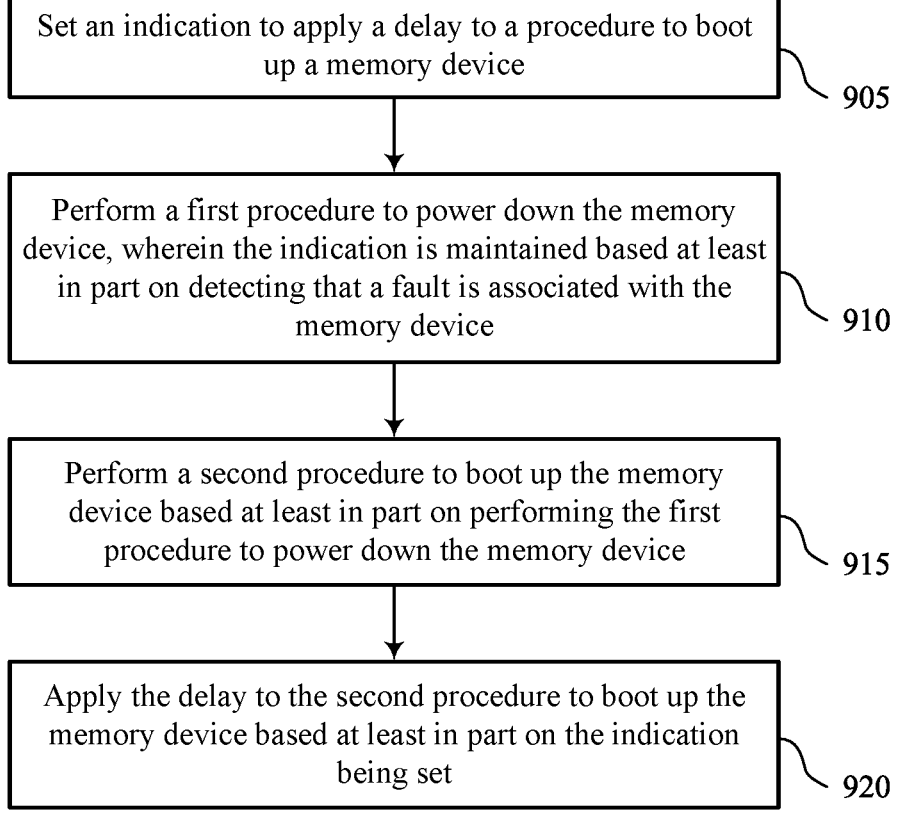

Set an indication to apply a delay to a procedure to boot up a memory device

905

Perform a first procedure to power down the memory device, wherein the indication is maintained based at least in part on detecting that a fault is associated with the memory device

910

Perform a second procedure to boot up the memory device based at least in part on performing the first procedure to power down the memory device

915

Apply the delay to the second procedure to boot up the memory device based at least in part on the indication being set

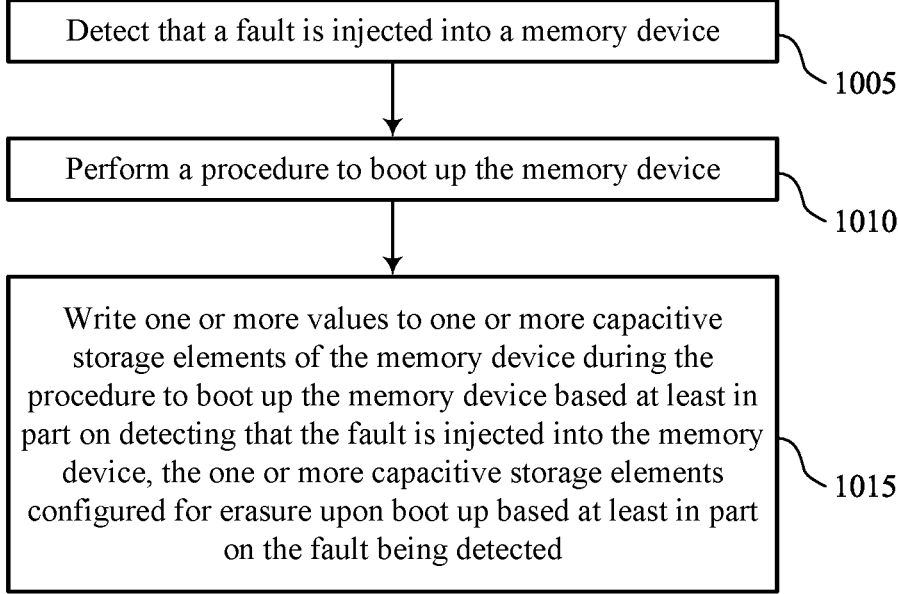

Detect that a fault is injected into a memory device ⟍ 1005

Perform a procedure to boot up the memory device ⟍ 1010

Write one or more values to one or more capacitive storage elements of the memory device during the procedure to boot up the memory device based at least in part on detecting that the fault is injected into the memory device, the one or more capacitive storage elements configured for erasure upon boot up based at least in part on the fault being detected ⟍ 1015

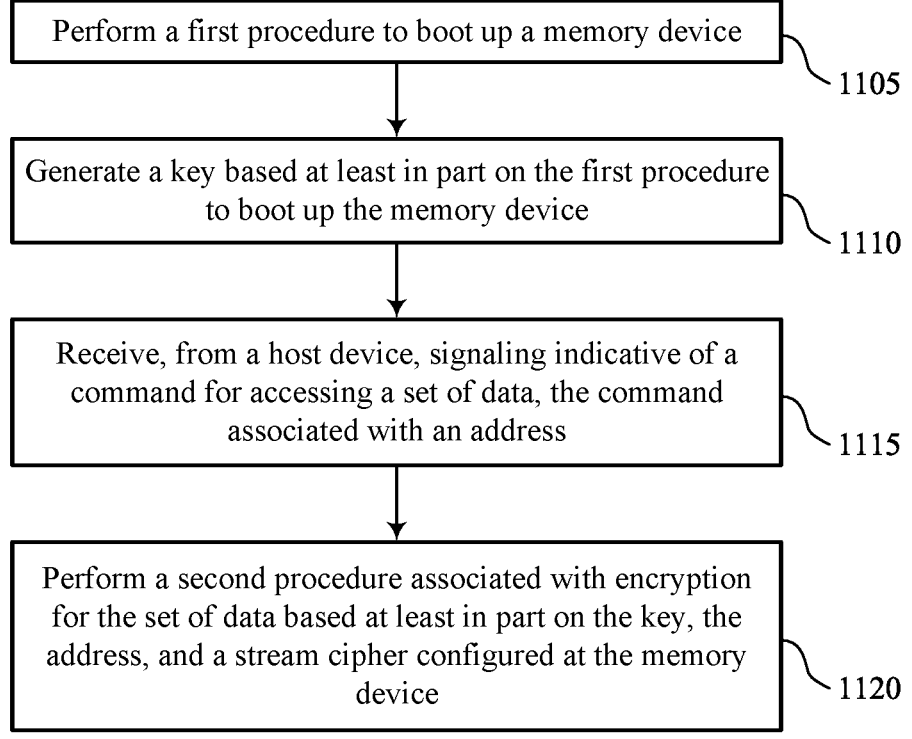

Perform a first procedure to boot up a memory device

1105

Generate a key based at least in part on the first procedure to boot up the memory device

1110

Receive, from a host device, signaling indicative of a command for accessing a set of data, the command associated with an address

1115

Perform a second procedure associated with encryption for the set of data based at least in part on the key, the address, and a stream cipher configured at the memory device

PROTECTIVE ACTIONS FOR A MEMORY DEVICE BASED ON DETECTING AN ATTACK

The present application for patent claims the benefit of U.S. Provisional Patent Application No. 63/347,861 by Boehm et al., entitled "PROTECTIVE ACTIONS FOR A MEMORY DEVICE BASED ON DETECTING AN ATTACK," filed Jun. 1, 2022, assigned to the assignee hereof, and expressly incorporated by reference in its entirety herein.

FIELD OF TECHNOLOGY

The following relates to one or more systems for memory, including protective actions for a memory device based on detecting an attack.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 9 through 11 show flowcharts illustrating methods that support protective actions for a memory device based on detecting an attack in accordance with examples as disclosed herein.

DETAILED DESCRIPTION

Figure 1:
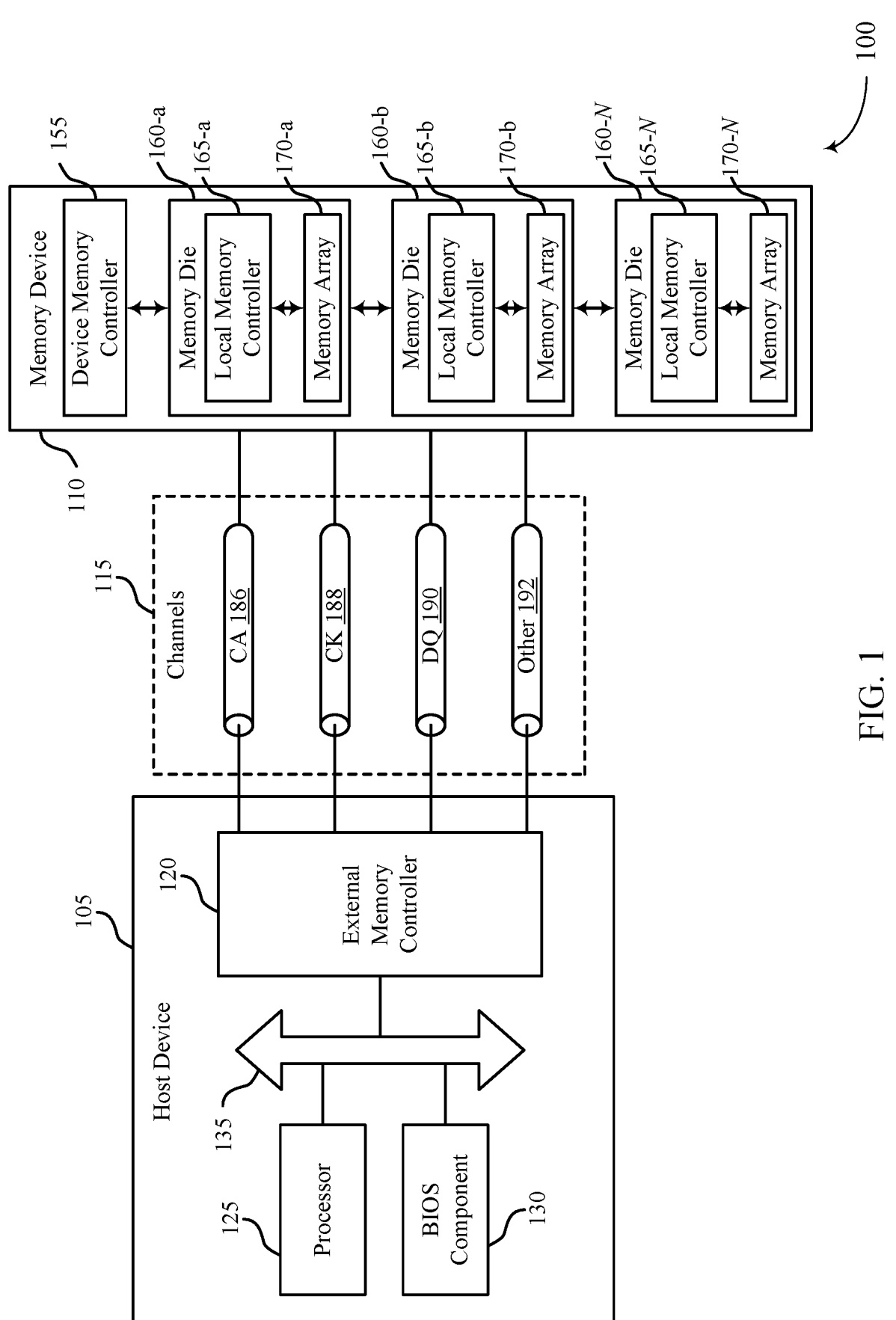
FIG. 1 illustrates an example of a system that supports protective actions for a memory device based on detecting an attack in accordance with examples as disclosed herein.

A system, such as an automotive system (e.g., a vehicle), may include a host device coupled with a memory device. The host device and the memory device may communicate information (e.g., commands, data) using signaling over one or more channels between the host device and the memory device. In some cases, an attack on the memory device may affect one or more aspects of the memory device (e.g., an input from the host device to the memory device, a measurement at the memory device, signaling at the memory device). For example, modifying (or otherwise affecting) a printed circuit board (PCB) at the memory device (e.g., by adding an interposer, modifying cabling, modifying a socket, or some combination thereof) may cause a change (e.g., an abrupt change) to a voltage input to the memory device, may affect a clock signal input to the memory device, or may affect some other input to the memory device. Additionally or alternatively, removing the memory device or a component of the memory device (e.g., a dynamic random access memory (DRAM) component) from the system may change one or more aspects of the DRAM component. In some examples, an unauthorized user (e.g., a hacker, a customer) may remove the memory device, such as the DRAM, or otherwise modify the memory device to capture secure communications or read secure information, among other examples, from the memory device, such as the DRAM. Detecting such an attack, before the attack occurs or even as the attack occurs, may allow the memory device— such as the DRAM—to perform operations to mitigate the theft of secure or other information and to prevent future theft of secure or other information.

As disclosed herein, a system may support one or more techniques for securing information at a memory device, such as the DRAM component of the memory device if an attack on the memory device is detected. Potential attacks on the memory device may result in a fault being injected into the memory device. The memory device may support one or more techniques for detecting that a fault is injected into the memory device and may apply a delay during a boot up procedure for the memory device if a fault is detected. The delay may slow attacks on the memory device, allow more time for the memory device to perform protective actions during boot up, or both, among other actions. To ensure the delay is applied, the memory device may default to setting an indication to apply the delay at boot up, and the memory device may remove the indication to apply the delay during a normal power down procedure if a fault is not detected. In this way (e.g., removing an indication to apply a delay if no fault is detected, as opposed to adding an indication to apply a delay if a fault is detected) may improve the reliability of the system, as an attacker may fail to avoid the delay by resetting the memory device before a fault is detected (e.g., because such resetting avoids a normal power down procedure). Additionally or alternatively, the memory device may erase information from non-volatile memory during boot up if a fault is detected. The memory device may be configured to ensure at least a portion (e.g., subset) of memory resources (e.g., resources configured to store sensitive or other information) is erased during boot up. The memory device may be configured for sequential erasure of data during boot up or parallelized erasure of data during boot up. In some examples, the memory device may encrypt and decrypt data using a stream cipher to further improve security of the data. The stream cipher may efficiently support encryption processes without introducing significant latency (e.g., over a latency threshold) into the access procedures. Any combination of such techniques may improve the security of data stored at a memory device, for example, by encrypting data at rest, erasing data in response to fault detection, delaying power up in response to fault detection, or any combination thereof.

Features of the disclosure are initially described in the context of a system as described with reference to FIG. 1. Further features of the disclosure are discussed with reference to procedures, configurations, and encryption processes as described with reference to FIGS. 2 through 4. Features of the disclosure are described in the context of process flows as described with reference to FIGS. 5 through 7. These and other features of the disclosure are further illustrated by and described with reference to an apparatus diagram and flowcharts that relate to protective actions for a memory device based on detecting an attack as described with reference to FIGS. 8 through 11.

FIG. 1 illustrates an example of a system 100 that supports protective actions for a memory device based on detecting an attack in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include an I/O controller. An I/O controller may manage data communication between the processor 125 and the peripheral component(s) (e.g., input devices, output devices). The I/O controller may manage peripherals that are not integrated into or with the system 100 or the host device 105. In some examples, the I/O controller may represent a physical connection (e.g., one or more ports) with external peripheral components.

In some examples, the system 100 or the host device 105 may include an input component, an output component, or both. An input component may represent a device or signal external to the system 100 that provides information (e.g., signals, data) to the system 100 or its components. In some examples, and input component may include an interface (e.g., a user interface or an interface between other devices). In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive information (e.g., data, commands, or both) from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., transmission mediums, conductors) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

In some examples, the one or more other channels 192 may include one or more error detection code (EDC) channels. The EDC channels may be operable to communicate error detection signals, such as checksums, to improve system reliability. An EDC channel may include any quantity of signal paths.

In some examples, the system 100 may be an example of an automotive system (e.g., a vehicle). For example, the host device 105 and the memory device 110 may both be components of a vehicle, and the host device 105, the memory device 110, or both may be further coupled with other components of the vehicle. In some cases, a system 100 may be susceptible to attacks from hackers or other users. For example, a user (e.g., a hacker) may probe a memory device 110, such as a DRAM bus or another type of memory device or component, to determine information from the memory device 110. In this way, the user may gain access to secure information or components (e.g., firmware, keys, plaintext data) of the memory device 110 that is intended to be hidden from or inaccessible to the user. Secure information may be information stored at a device (e.g., a vehicle) or information communicated in an ecosystem (e.g., between the vehicle and other devices or cloud components). In some cases, a user may manipulate information at the vehicle or may manipulate communication information to trigger specific responses, access specific data, or cause other responses at the memory device 110. In some examples, such manipulations may involve or cause faults at the memory device 110. A fault may be any inconsistency identified at the memory device 110, such as an unexpected change in a channel condition, an unexpected change in temperature, an access error at the memory device 110, or any other occurrence at the memory device 110 that may potentially indicate an attack on the memory device 110.

A user (e.g., a hacker) may perform one or more different types of attacks to try to access secure information at a memory device 110. In a first example, the user may physically remove the memory device 110 or a portion of the memory device 110 from the system 100 (e.g., from the vehicle). For example, while the vehicle is turned off and the memory device 110 is in an idle state, the user may remove the memory device 110 and probe the memory device 110 for information (e.g., by detecting information on a DRAM or bus, by putting the memory device 110 into a reader to read out information, or by using some other technique). In some cases, the user may remove the DRAM component (e.g., from or as part of a PCB) at the memory device 110, may install an interposer with a breakout cable, and may capture DRAM traffic using a protocol analyzer. In some other cases, the user may freeze the DRAM, other memory device components, or both (e.g., using a substance to supercool the memory device 110 relatively quickly), then remove the cooled memory device 110, and probe the removed memory device 110. For example, the user may remove the DRAM ball grid array (BGA) component from the PCB, solder down the DRAM socket, and install a different DRAM in the socket. This different DRAM may be programmed with data during operation of the vehicle. After the memory device enters a lower power mode such as a sleep mode (e.g., persisting data in RAM), the user may supercool the DRAM (e.g., with freeze spray) and remove the cooled DRAM. Supercooling the DRAM may cause the array to retain at least some data without performing a refresh operation for a significant period of time. The user may place the removed DRAM in another socket board that may be unlocked or have additional test equipment to read the contents of the array, searching for keys to decrypt the secure storage. The user may capture a significant quantity of information (e.g., terabytes of data) over a period of time (e.g., one or more days) while the memory device 110 is removed using one or more of these techniques.

In a second example, a user may probe the memory device 110 while the memory device 110 is in place within the system 100 (e.g., without removing the memory device 110 or a portion of the memory device 110 from the vehicle). For example, if a vehicle remains idle (e.g., parked) for a significant time period (e.g., multiple days or weeks), the user may probe the memory device 110 in place over the course of a few days or a longer duration. Similar to the first example, the user may capture a significant quantity of information (e.g., terabytes of data) over a period of time (e.g., one or more days) without removing the memory device 110 from the system 100.

In a third example, a user may install a third-party device within the system 100 (e.g., on a vehicle, for example, without the knowledge of the vehicle's owner). The third-party device may read or gather information from the memory device 110 and may transmit the information back to the user (e.g., in real-time or according to some periodicity or trigger condition). In some cases, the added third-party device may read information while the vehicle is in operation. For example, the third-party device may use a DRAM logic analyzer or another component to perform channel analysis on the memory device 110, the host device 105, or both. The third-party device may capture and transmit information to the user while the vehicle is parked, while the vehicle is operating, or a combination thereof.

Any of these attacks may result in a fault being injected into the memory device 110. For example, removing or freezing the DRAM may cause a significant change to conditions at the DRAM, causing a fault detector to determine that a fault associated with the DRAM occurred. Similarly, probing the memory device 110 or installing a third-party device within the system 100 may be detected by a fault detector. In some systems 100, a memory device 110 detecting that a fault is injected into the memory device 110 may apply a delay during a boot up procedure for the memory device 110. The delay may slow attacks on the memory device 110, allow more time for the memory device 110 to perform protective actions during boot up, or both. To ensure the delay is applied, the memory device 110 may default to applying the delay and may remove an indication to apply the delay if a fault is not detected. In this way (e.g., removing an indication to apply a delay if no fault is detected, as opposed to adding an indication to apply a delay if a fault is detected) may improve the reliability of the system 100, as an attacker cannot quickly reset the memory device 110 before a fault is detected in order to avoid the delay.

Additionally or alternatively, the memory device 110 may erase information from non-volatile memory during boot up, for example, if a fault is detected. The memory device 110 may be configured to ensure at least a specific portion of memory resources (e.g., resources configured to store sensitive information) is erased during boot up. The memory device 110 may be configured for sequential wiping of data during boot up or parallelized wiping of data during boot up. In some examples, the memory device may store data using a stream cipher to improve security of the data. The stream cipher may efficiently support encryption processes without introducing significant latency (e.g., over a latency threshold) into the access procedures.

Though some examples may be described herein in terms of DRAM, ferroelectric RAM (FeRAM), or other capacitive-based memory types, it is to be understood that aspects of the teachings herein may be applied to any memory device (e.g., various types and combinations of volatile memory, non-volatile memory, or some combinations of both). Additionally, although some examples may be described herein in terms of vehicles and automotive systems, it is to be understood that the teachings herein may be applied to any system and various examples outside of the vehicle context, which is merely one example implementation.

Figure 2:
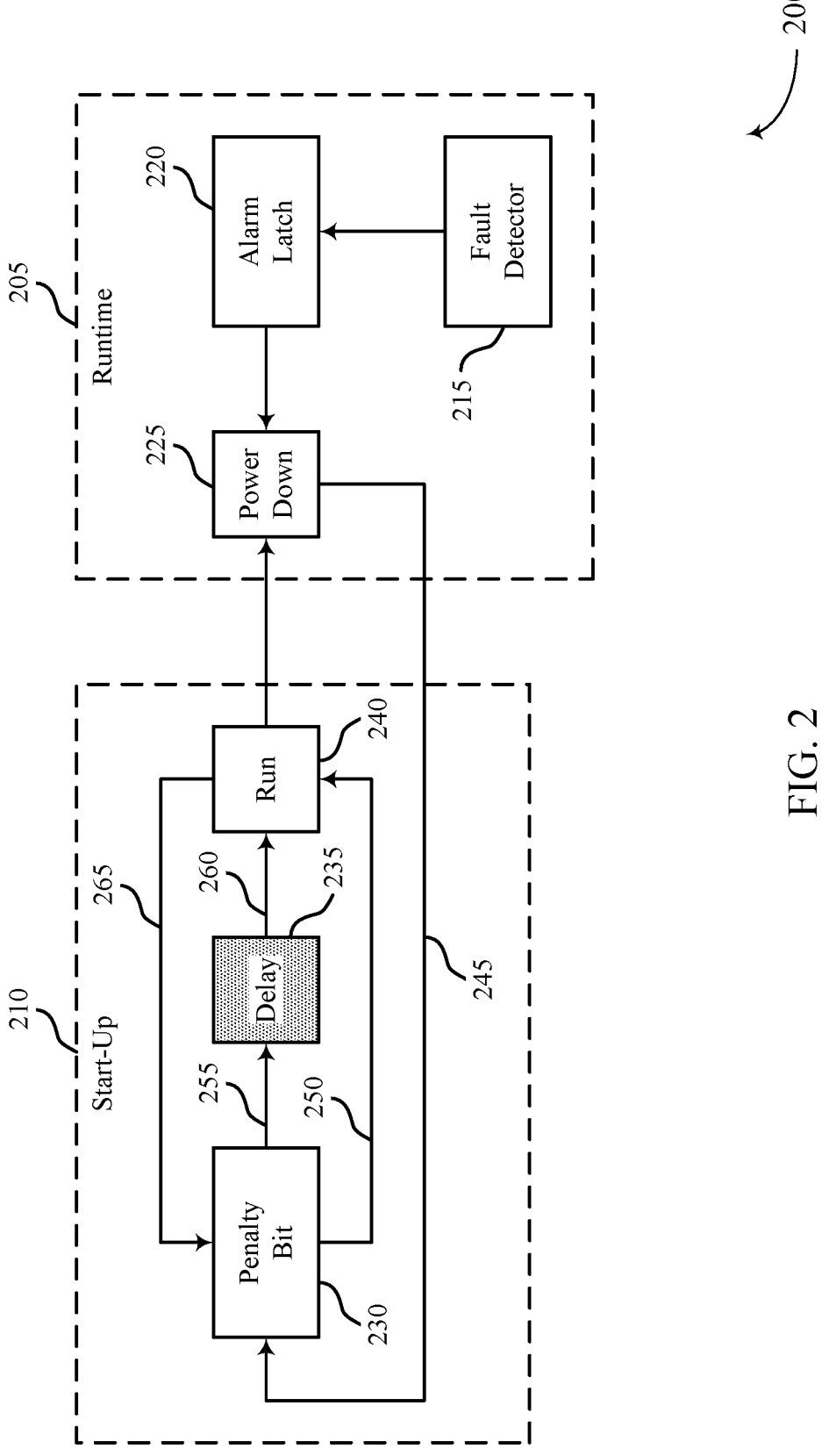
FIG. 2 illustrates an example of a start-up penalty procedure that supports protective actions for a memory device based on detecting an attack in accordance with examples as disclosed herein.

FIG. 2 illustrates an example of a start-up penalty procedure 200 that supports protective actions for a memory device based on detecting an attack in accordance with examples as disclosed herein. The start-up penalty procedure 200 may be performed by a memory device, such as a memory device 110 as described with reference to FIG. 1. The start-up penalty procedure 200 may include one or more operations during runtime 205 and one or more operations during start-up 210 (e.g., during a boot up procedure). The start-up penalty procedure 200 may allow a memory device to apply a default delay during start-up 210 that supports the completion of one or more protective actions during start-up 210, for example, if an attack on the memory device is detected. The memory device may apply the delay using a clock or clock signal, a timer, a capacitor, or some other physical component, logical component, or combination thereof.

As described herein with reference to FIG. 1, a fault may be injected into a system (e.g., a system including a memory device, such as an automotive system) to bypass a security check, effect cryptographic operations, or both in order to circumvent the security of the system. Such faults may allow a malicious user to access sensitive information (e.g., information that is not intended to be accessible by the malicious user) stored at the memory device. In some examples, a fault may affect the voltage at the memory device, the clock (e.g., clock signal) at the memory device, an electromagnetic field at the memory device, a bad block indication (BBI) at the memory device, a laser-based operation at the memory device, other aspects, or any combination thereof. If the memory device or another device detects a fault, the memory device may perform one or more corrective actions to protect against a potential attack on the memory device. For example, the memory device may be configured to wipe (e.g., erase) specific data, keys, or both to protect against data being accessed by a malicious user based on the fault. Additionally or alternatively, the memory device may track a fault counter and may impose relatively more severe penalties (e.g., more aggressive protective actions) if a threshold quantity of attacks (e.g., N faults) are detected. Such protective actions may, however, take a non-trivial amount of time to perform. For example, to erase sensitive data at the memory device, the memory device may perform multiple wipe operations, which may take a threshold amount of time. To support these operations, the memory device may impose a time penalty during start-up 210, during which the memory device may perform one or more protective actions if a fault was detected. Additionally or alternatively, imposing the time penalty may slow down a potential attack. For example, fault injection may be probabilistic, where injecting a fault may have a relatively small change of successfully bypassing security. To overcome this, an attacker may inject a large quantity of faults (e.g., thousands or millions of faults) and perform a large quantity of resets (e.g., thousands or millions of resets) within a short time span (e.g., seconds, minutes, hours) to improve the likelihood of a fault bypassing security. Slowing the boot up time by applying a start-up penalty may significantly slow the attacks, reducing the risk to the memory device or effectively changing the timeframe of an attack (e.g., from taking hours or a day to taking multiple months to bypass security). However, in some cases, an attacker my reboot the memory device in an attempt to bypass the start-up penalty.

Some other systems may set a bit in response to detecting a fault. This bit may be a non-volatile bit, so that upon powering down and booting back up (e.g., if the memory device is power-cycled or otherwise reset), the system may trigger a delayed start-up if the non-volatile bit is set. However, in such systems, an attacker may potentially power off the device before the bit is set. For example, the attacker may inject a fault into the device and power down the memory device before the memory device is able to detect the fault and set the non-volatile bit to a specific value to trigger a delayed start-up. In such examples of some other systems, the attacker may effectively bypass protective actions supported by the memory device and may potentially gain access to secure information upon restarting the memory device.

In contrast, a memory device may use the start-up penalty procedure 200 to apply a default start-up penalty during bootup. That is, the memory device may set the bit at start-up 210 and may refrain from unsetting the bit (e.g., setting the bit to a value indicating not to apply the start-up penalty) unless the memory device performs a normal reset or power-cycle procedure. In this way, if an attacker resets the memory device as part of an attack, the memory device may not unset the bit and may default to applying the start-up penalty, slowing the attack on the memory device and allowing time for the memory device to perform one or more protective actions.

The penalty bit 230 may be set to a default value (e.g., "1," or another bit value) indicating for the memory device to apply a delay during start-up 210. At runtime 205, the memory device may use a fault detector 215 to determine whether a fault is injected into the memory device. The fault detector 215 may be an example of any physical components, logical components, or combination thereof configured to identify faults. For example, the fault detector 215 may monitor for changes to the memory device or to the system including the memory device that potentially indicate a modification to the memory device (e.g., an attack on the memory device). The fault detector 215 may be coupled with an alarm latch 220. If the fault detector 215 detects a fault, the fault detector 215 may update the alarm latch 220 to indicate that a fault has been detected. In some examples, the memory device may close the alarm latch 220 (e.g., using an electrical signal generated by the fault detector 215). A closed alarm latch may indicate that a fault has been detected at the memory device.

If the memory device performs a power down procedure 225, the memory device may check whether a fault has been detected using the alarm latch 220 as part of or based on the power down procedure 225. For example, the memory device may send a signal through the alarm latch 220. If the alarm latch 220 indicates that a fault has been detected (e.g., if the alarm latch 220 is closed, allowing the transmitted signal to pass through the alarm latch 220), the memory device may refrain from modifying the value of the penalty bit 230. However, if the alarm latch 220 indicates that a fault has not been detected (e.g., if the alarm latch 220 is open), at 245, the memory device may update the value of the penalty bit 230 (e.g., to "0," or another bit value) indicating for the memory device to refrain from applying the delay during start-up 210. For example, the memory device may perform a standard boot up procedure without an additional delay, which may be referred to as a normal reset or normal power-cycle and may improve the efficiency of start-up 210 for the memory device. In this way, if a fault is not detected, the memory device unsets the penalty bit 230 during the power down procedure 225, not during start-up 210. In this way, if an attacker resets the memory device in an attempt to hide a fault injected into the memory device, the memory device may skip checking the alarm latch 220 and—accordingly—may fail to unset the penalty bit 230, defaulting to adding the start-up delay as if a fault was detected regardless.

During start-up 210, the memory device may check the value of the penalty bit 230 to determine whether to apply a delay 235 to the start-up 210. The memory device may store the penalty bit 230 in non-volatile memory to ensure that the value of the penalty bit 230 is maintained when the memory device is powered down. If the penalty bit 230 is set to a first value (e.g., a default value, such as "1" or "True"), at 255, the memory device may apply a delay 235 to the start-up 210. For example, the memory device may wait a threshold amount of time (e.g., N seconds or milliseconds) before completing a boot up procedure. During the N seconds or milliseconds, the memory device may refrain from performing access operations or may refrain from responding to access commands received at the memory device (e.g., from a host device or other external device). In some cases, the memory device may perform other operations during the delay 235. For example, the memory device may perform protective actions, such as erasing sensitive data or encryption keys that provide access to sensitive information. Additionally or alternatively, the memory device may pause at least some functionality during the delay 235 (e.g., may limit one or more types of operations performed on, by, or related to the memory device). After the delay 235 is complete, at 260, the memory device may run 240. That is, the memory device may enter runtime 205 and operate normally, or the memory device may enter runtime 205 but support a limited set of commands or sensitive information (e.g., if the memory device performed specific protective actions during the delay 235).

If the penalty bit 230 is set to a second value (e.g., "0" or "False"), at 250, the memory device may refrain from applying the delay 235. For example, the penalty bit 230 may be set to the second value to indicate that no faults were detected during runtime 205, so the memory device may perform a normal reset procedure. Refraining from applying the delay 235 in such examples may improve the efficiency of the memory device by supporting low-latency boot up, among other benefits.

In either case (e.g., whether or not the memory device applied the delay 235), the memory device may reset the penalty bit 230 to the default value. For example, at 265, the memory device may set the penalty bit 230 to the default value (e.g., "1" or "True") during start-up 210, upon completion of start-up 210, or upon entering runtime 205. Defaulting the penalty bit 230 back to applying the delay 235 protects against future attackers resetting the memory device.

As described herein, the penalty bit 230 may be an example of a bit stored in non-volatile memory (e.g., in electrically erasable programmable read-only memory (EE-PROM)). Alternatively, the information of the penalty bit 230 may be stored in other forms or using other components. For example, to protect against wear degradation, the memory device may use an on-die capacitor to apply the delay 235 to start-up 210. In such an example, the memory device may include a capacitor-based fault detection penalty circuit. The memory device may charge the capacitor as a default, where the charged capacitor indicates to apply the delay 235 (e.g., the charged capacitor may be equivalent to setting the penalty bit 230 to "1" or "True"). Specifically, at start-up 210, the memory device may automatically charge the capacitor. For a normal reset or normal power-cycle procedure (e.g., if the fault detector 215, the alarm latch 220, or both indicate that a fault has not been detected at runtime 205), the memory device may discharge the capacitor during the power down procedure 225. During start-up 210, if the capacitor is charged, the memory device may apply the delay 235 (e.g., a threshold delay, which may be N seconds or milliseconds for example) at 255. If the capacitor is not charged (e.g., if the capacitor was discharged during power down), the memory device may refrain from applying the delay 235 at 250. In some examples, the capacitor discharge may be tuned to be greater than or equal to the threshold delay time, N, to ensure that the memory device is powered down at least N seconds or milliseconds (for example), even if a normal reset or normal power-cycle is performed. That is, if the memory device is powered down and a fault was not detected, the memory device may trigger discharging the capacitor. However, if start-up 210 is triggered at the memory device prior to the capacitor completing the discharge (e.g., after an amount of time less than the capacitor discharge time, which may be greater than or equal to N), the capacitor may still store a portion of the charge and may trigger applying the delay 235 (e.g., due to the discharge not being complete). This may provide an additional backup to enforce the penalty in specific scenarios.

The duration of the delay 235, N, may be pre-configured at the memory device, or dynamically determined, or configurable. In some examples, the memory device may be configured with the delay duration, N, during setup. For example, the delay duration may be configured by an industry standard, or a manufacturing standard or configuration, or set based on one or more capabilities of the memory device (e.g., a duration for performing one or more protective actions, a duration for slowing memory device attacks). Additionally or alternatively, the memory device may dynamically determine the delay duration. For example, the memory device may increase the delay duration based on a quantity of faults detected within a time window, a quantity of start-ups 210 performed within a time window, or some combination of these or other parameters. Additionally or alternatively, the delay duration may be configurable, for example, by a host device or another device. In some examples, the memory device may additionally increase a discharge speed of capacitors (e.g., capacitive storage elements) to speed up data erasure during boot up of the memory device. Additionally or alternatively, the delay duration may support increased discharging of capacitors during boot up.

Figure 3:
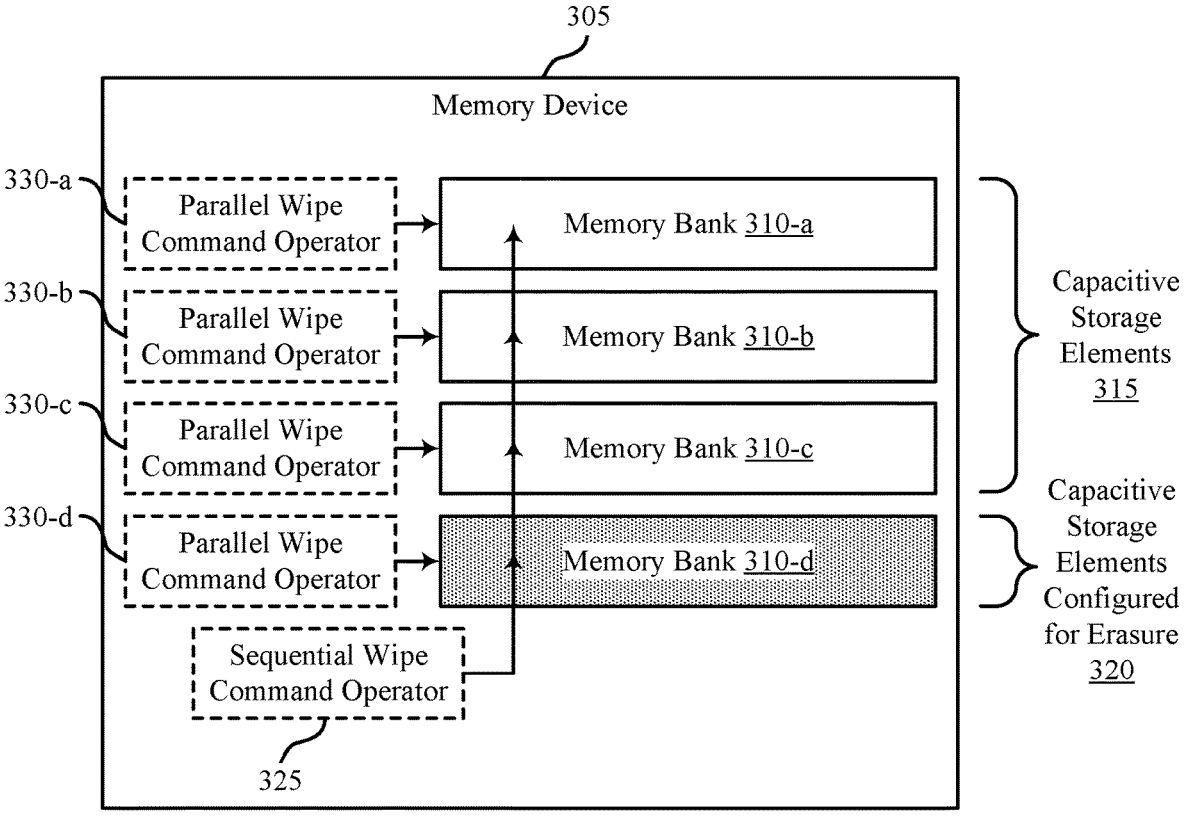
FIG. 3 illustrates an example of a memory device configuration that supports protective actions for a memory device based on detecting an attack in accordance with examples as disclosed herein.

FIG. 3 illustrates an example of a memory device configuration 300 that supports protective actions for a memory device based on detecting an attack in accordance with examples as disclosed herein. The memory device configuration 300 may be implemented at a memory device 305, which may be an example of a memory device 110 as described with reference to FIG. 1. The memory device configuration 300 may support DRAM-forced discharge based on a detected attack on the memory device 305. For example, the memory device configuration 300 may include a portion of memory configured for erasure if a fault is detected at the memory device 305, potentially indicating an attack on the memory device 305. The memory device 305 may support one or more techniques for erasure of data to ensure that sensitive information stored at the memory device 305 is protected if the memory device 305 is subject to a potential attack from a malicious user.

The memory device 305 may include or be an example of a DRAM. The DRAM may, in some examples, store information in non-volatile storage, for example, using capacitive storage elements 315. By using non-volatile storage, the DRAM may persist information stored in memory when the memory device 305 powers down. However, persisting such information may potentially pose a threat to the information when the memory device 305 enters a powered down state. For example, a malicious user may probe the memory device 305 or perform other invasive attacks while the memory device 305 is powered down in order to extract confidential security parameters (CSPs) from the memory device 305. Additionally or alternatively, the memory device 305 performing a reboot or reset procedure may leave the persisted data unprotected due to fault injection or other attacks. As such, while persisting data in non-volatile memory during power down may improve data storage and latency, it may also introduce potential threats to data security. Using data encryption, initialization of data on power up, or both may improve data security, but may introduce significant latency into the system.

In some examples, the memory device 305 may detect that a fault was injected into the memory device 305. For example, the memory device 305 may use a fault detector or other method or technique to determine whether a fault was injected into the memory device 305. A fault may indicate a potential attack on the memory device 305. In response, the memory device 305 may erase data from memory to ensure that the data cannot be accessed by an attacker injecting the fault. For example, the attacker may reset the memory device 305 in an attempt to gain access to the data stored at the memory device 305 using one or more faults injected into the memory device 305. If the memory device 305 detects one or more faults, the memory device 305 may perform a procedure to erase data from the memory device 305 during boot up. However, in some cases, the time available during boot up may support erasing a subset of DRAM rows at the memory device 305 during the boot up procedure. That is, the memory device 305 may use a first threshold time to erase all of the data stored in non-volatile memory at the memory device 305, but the boot up procedure may occur within a second threshold time shorter than the first threshold time. In some examples, the second threshold time may be defined by a standard, such as the Joint Electron Device Engineering Council (JEDEC) standard. As such, some other systems may fail to erase all sensitive information from the memory device 305 during boot up based on the time to perform the erasures.

In contrast, the memory device 305 may use the memory device configuration 300 to ensure that information (e.g., sensitive information) is erased from the memory device 305 if one or more faults are detected (e.g., a first fault is detected, a quantity of faults exceeding a threshold quantity are detected within a time window). The memory device 305 may include multiple memory banks 310, where each memory bank 310 may include a quantity of capacitive storage elements 315. For example, the memory device 305 may include a memory bank 310-a, a memory bank 310-b, a memory bank 310-c, and a memory bank 310-d. In some examples, the memory device 305 may configure a set of capacitive storage elements for erasure upon detection of a fault. For example, the memory bank 310-d may include capacitive storage elements configured for erasure 320, while the other memory banks 310 may include capacitive storage elements 315 that may or may not be erased in response to fault detection. In some cases, a datasheet defining the memory device configuration 300 may specify that a specific quantity of capacitive storage elements, memory cells, rows of memory cells, memory banks 310, or some combination thereof will be wiped on boot up (e.g., automatically or in response to detecting one or more faults associated with the memory device 305). The memory device 305 may ensure that sensitive information (e.g., CSPs or other sensitive information to be protected from potential attackers) is stored in the capacitive storage elements configured for erasure 320, for example, using a basic input/output system (BIOS), an operating system (OS), software, hardware, firmware, or any combination of these or other components of the memory device 305.

If the memory device 305 receives information to store in non-volatile memory, the memory device 305 may determine whether the information includes sensitive information. For example, sensitive information may be associated with one or more security parameters or policies defining rules for storing the information, erasing the information, encrypting the information, or any combination thereof. Based on the security parameters or policies, the memory device 305 may determine that information to store includes sensitive information and may correspondingly write the information to capacitive storage elements configured for erasure 320 (e.g., in a specific memory bank, such as the memory bank 310-d). In some examples, the memory device 305 may automatically erase (e.g., write over with other bit values) the sensitive information stored in the capacitive storage elements configured for erasure 320 during a procedure for boot up. In some other examples, the memory device 305 may trigger erasing the sensitive information stored in the capacitive storage elements configured for erasure 320 during a procedure for boot up if the memory device 305 detected one or more faults associated with the memory device 305. The size of the memory resources configured for erasure may be configured such that the memory device 305 may guarantee erasure of the memory resources during a boot up procedure based on the threshold time for performing the boot up procedure. Other memory resources may be additionally erased during boot up, but the memory device 305 may not guarantee the erasure of such other memory resources. By writing sensitive information to specific memory resources of the memory device 305 and ensuring erasure of these memory resources during boot up (e.g., during limited time resources allocated for boot up), the memory device 305 may protect sensitive information stored at the memory device 305 against attack.

In some examples, the memory device 305 may be configured with a sequential wipe command operator 325. The sequential wipe command operator 325 may be an example of circuitry, logic, or both configured to perform erasure on memory resources of the memory device 305. In some cases, the sequential wipe command operator 325 may be coupled with—or a component of—a memory device controller for the memory device 305. The sequential wipe command operator 325 may erase information stored at the memory device 305 in sequence (e.g., by row). That is, the sequential wipe command operator 325 may overwrite capacitive storage elements of the memory device 305 with default values or random values to erase the information previously stored at the capacitive storage elements. By using a sequential approach in some examples, the sequential wipe command operator 325 may ensure that specific rows of memory cells are erased prior to other rows of memory cells. As such, the memory device 305 may ensure that one or more specific rows of memory cells including the capacitive storage elements configured for erasure 320 are erased during a boot up procedure (e.g., based on being wiped first according to the sequence), while other rows of memory cells including capacitive storage elements 315 may or may not be erased during the boot up procedure (e.g., depending on an amount of time available during the boot up procedure to perform erasure operations).

In some other examples, the memory device 305 may be configured with one or more techniques for wiping the entire DRAM during boot up. In some cases, the memory device 305 may be configured with circuitry, logic, or both configured to complete erasure of the capacitive storage elements of the memory device 305 within the threshold time allocated for boot up. For example, the memory device 305 may be architected to allow for a full DRAM wipe upon boot up if some conditions are detected. In one example, the memory device 305 may include multiple parallel wipe command operators 330. A parallel wipe command operator 330 may operate on a specific memory bank 310 and may use a specific power source. As such, the parallel wipe command operators 330 may perform erasure operations on the memory banks 310 in parallel, allowing the memory device 305 to reduce the latency involved in erasure operations. By performing parallel erasure operations, the memory device 305 may ensure that the memory resources of the DRAM are erased (e.g., overwritten with default or random bit values) within the time allocated for boot up. As an example, the memory device 305 may include a first parallel wipe command operator 330-*a* for erasing data stored in a first memory bank 310-*a*, a second parallel wipe command operator 330-*b* for erasing data stored in a second memory bank 310-*b*, a third parallel wipe command operator 330-*c* for erasing data stored in a third memory bank 310-*c*, and a fourth parallel wipe command operator 330-*d* for erasing data stored in a fourth memory bank 310-*d*. In such examples, the memory device 305 may support the erasure of information from all (or a specific set of) capacitive storage elements 315 in non-volatile memory during boot up (e.g., automatically or in response to detecting a fault associated with the memory device 305). As such, the memory device 305 may write sensitive information to any memory resources within the memory device 305, rather than modifying write operations to write sensitive information to a specific portion of the memory device 305 configured for erasure.

Additionally or alternatively, the memory device 305 may use techniques described, for example with reference to FIG. 2, to ensure erasure of sensitive information. For example, the memory device 305 may apply a delay to a boot up procedure in response to detecting one or more faults associated with the memory device 305. The delay may allow the boot up procedure to span a threshold time sufficient for erasing a specific subset of capacitive storage elements configured for erasure 320 at the memory device 305 or erasing all of the capacitive storage elements 315 at the memory device 305.

Figure 4:
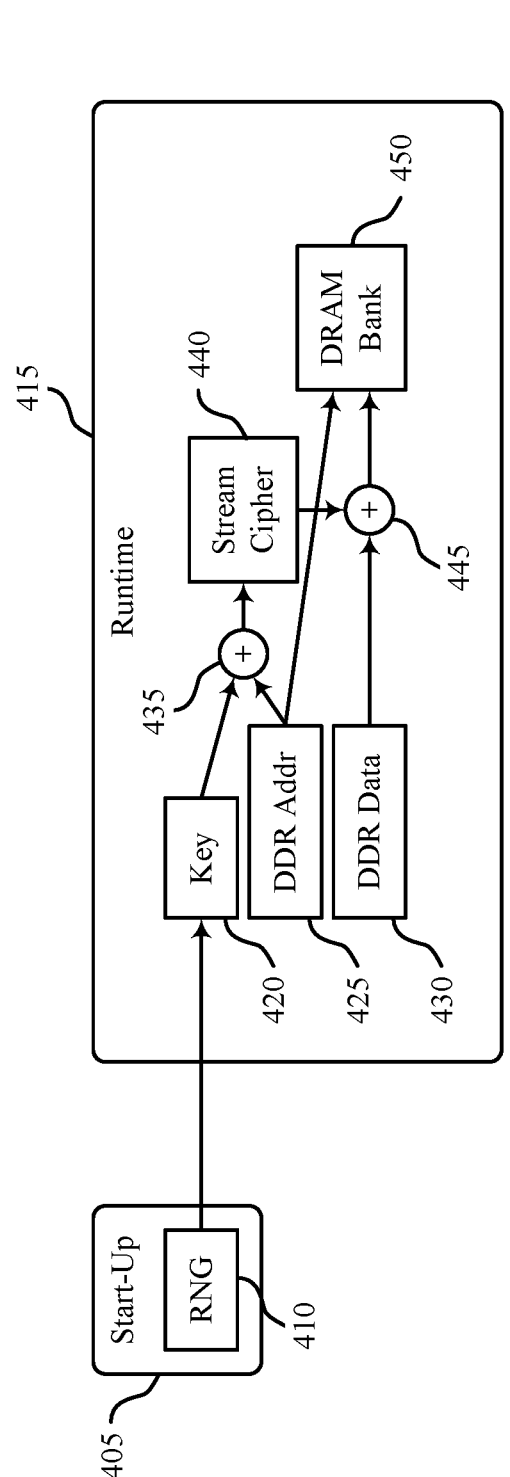
FIG. 4 illustrates an example of an encryption process that supports protective actions for a memory device based on detecting an attack in accordance with examples as disclosed herein.
Figure 4:

FIG. 4 illustrates an example of an encryption process 400 that supports protective actions for a memory device based on detecting an attack in accordance with examples as disclosed herein. The encryption process 400 may be performed by a memory device, such as a memory device 110 as described with reference to FIG. 1. The encryption process 400 may include one or more operations during start-up 405 (e.g., during a boot up procedure) and one or more operations during runtime 415. The encryption process 400 may use a stream cipher 440 for encryption and decryption of data. The stream cipher may be or include hardware configured at the memory device to reduce bandwidth and the processing power for performing encryption at the memory device. Such a stream cipher 440 may protect data (e.g., all data, sensitive data associated with a security protocol) from potential attack without adding significant overhead to the access operations performed by the memory device.

During start-up 405, the memory device may randomly or pseudo-randomly generate a key 420 for the stream cipher 440. The memory device may include a number generator 410 (e.g., implemented in hardware, software, or a combination thereof) for determining the key 420. The memory device may temporarily store the key 420 for use during runtime 415. In some examples, the memory device may store the key 420 in volatile memory. In some other examples, the memory device may store the key 420 in non-volatile memory configured for erasure upon powering down or booting up. The memory device may store an indicator or key identifier from which the memory device may recreate the key 420. If the memory device detects a fault associated with the memory device, in some cases, the memory device may erase the key 420, the key identifier, or any other information that would allow for retrieval of the key 420. Accordingly, the memory device may erase the key 420 used to encrypt—and, correspondingly, decrypt—at least a portion of data the memory device, effectively making this data inaccessible to a host device (e.g., to protect the data from attack).

During runtime 415, the memory device may use the key 420 and the stream cipher 440 to perform one or more encryption procedures (e.g., encrypt or decrypt data). Additionally or alternatively, the memory device may use other parameters in the encryption process. For example, the memory device may receive a write command indicating data 430 for storage at the memory device. The memory device may determine an address 425 at which to store the data (e.g., an address for storing the first bit of data, an address for storing the last bit of data). The memory device may input the key 420, the address 425 (e.g., a double data rate (DDR) address), or a combination thereof into the stream cipher 440 to obtain an output of the stream cipher 440. For example, the memory device may perform an exclusive or (XOR) operation 435 or some other operation between the key 420 and the address 425 and may input the resulting set of bits into the stream cipher 440. The set of bits resulting from the stream cipher 440 may be similarly combined with the data 430 (e.g., DDR data) to be written to the memory device (e.g., using an XOR operation 445 or some other operation) to effectively encrypt the data 430. This encrypted data may be stored in a DRAM bank 450 at the indicated address 425.

Similarly, during runtime 415, the memory device may receive a read command from a host device indicating an address 425 from which to read data 430 from storage at the memory device (e.g., in the DRAM bank 450). The memory device may retrieve the key 420 from memory to use for decryption of the data 430. The memory device may input the key 420, the address 425 (e.g., a DDR address), or a combination thereof into the stream cipher 440 to obtain an output of the stream cipher 440. For example, the memory device may perform an XOR operation 435 or some other operation between the key 420 and the address 425 and may input the resulting set of bits into the stream cipher 440. The memory device may retrieve encrypted data from the address 425 indicated by the read command and may combine the encrypted data with the output of the stream cipher 440 (e.g., using an XOR operation 445 or some other operation) to decrypt the data and determine the data 430 (e.g., DDR data) for sending to the host device in response to the read command.

The stream cipher 440 may receive a set of input bits (e.g., based on the key 420, the address 425, or both) and may encrypt the input bits in a stream (e.g., one bit at a time) to obtain an output set of bits (e.g., a keystream) for the stream cipher 440. The keystream may be XORed with the data 430 to determine encrypted data (i.e., ciphertext). The stream cipher 440 may operate on-the-fly as any quantity of bits is input into the stream cipher 440. The stream cipher 440 may be an example of a synchronous stream cipher, such that previous encryption processes performed by the stream cipher 440 may not affect current encryption processes performed by the stream cipher 440. In some cases, the stream cipher 440 may further use a randomly—or pseudo-randomly—generated nonce or seed as a further input to the stream cipher 440. The generation of the keystream from the key 420, the address 425, the nonce, or any combination thereof may rely on a current state of the stream cipher 440, such that the encryption may be stateful. The stream cipher 440 may be implemented at the memory device in hardware, software, or a combination thereof. Due to operating one bit at a time, the stream cipher 440 may reduce latency and processing resources associated with encryption at the memory device, allowing the memory device to provide a level of security to data written to the DRAM bank 450 without adding significant overhead to access operations at the memory device.

The encryption process 400 may be implemented with the additional delay to boot up described with reference to FIG. 2, the techniques for erasing data, keys 420, or both as described with reference to FIG. 3, or both. Such combinations of techniques may improve the security of information at a memory device. For example, the memory device may perform one or more protective actions associated with such techniques, for example, based on detecting an attack on the memory device.

Figure 5:
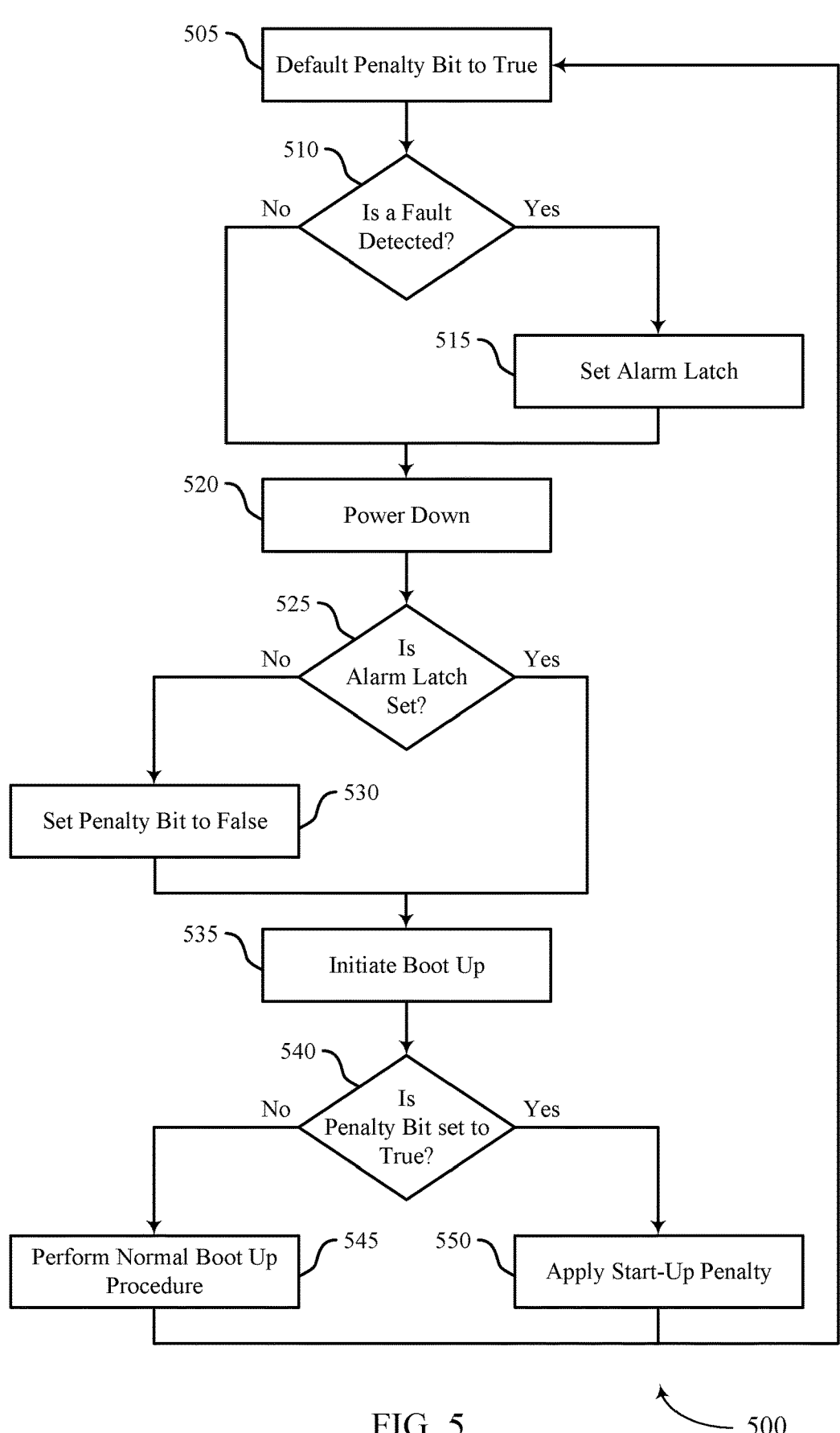
FIGS. 5 through 7 illustrate examples of process flows that support protective actions for a memory device based on detecting an attack in accordance with examples as disclosed herein.

FIG. 5 illustrates an example of a process flow 500 that supports protective actions for a memory device based on detecting an attack in accordance with examples as disclosed herein. The process flow 500 may be performed by devices described with reference to FIGS. 1 through 4. For example, a memory device—such as a memory device 110—may perform one or more aspects of the process flow 500. In some examples, the memory device may be associated with (e.g., a component of) a vehicle. The memory device may include—or be an example of—a DRAM. The process flow 500 may support applying a delay to the start-up of a memory device, as described with reference to FIG. 2. Alternative examples of the following may be implemented, where some steps are performed in a different order or not at all. Additionally, some steps may include additional features not mentioned below.

Aspects of the process flow 500 may be implemented by a controller, among other components (e.g., a memory device controller). Additionally or alternatively, aspects of the process flow 500 may be implemented by logic coupled with a memory device. For example, the logic may be operable to cause an apparatus to perform the operations of the process flow 500.

At 505, the memory device may set an indication to apply a delay to a procedure to boot up the memory device. In some examples, the memory device may write a first bit value (e.g., a default value) to a bit in memory, such as non-volatile memory (e.g., a penalty bit), where the first bit value indicates for the memory device to apply the delay. For example, the memory device may set a penalty bit to "True" as a default. In some other examples, the memory device may charge a capacitor to indicate for the memory device to apply the delay as a default.

At 510, the memory device may determine whether a fault is detected at the memory device. For example, the memory device may include a fault detector 215, an alarm latch 220, or both as described with reference to FIG. 2 to detect a fault associated with the memory device. In some cases, the fault detector may monitor one or more aspects of the memory device or the system including the memory device to determine whether a fault is injected into the memory device. In some examples, the fault detector may detect a change or modification to the memory device which may potentially indicate an attack on the memory device.

If a fault is not detected at 510, the memory device may refrain from setting an alarm latch. However, if a fault is detected at 510, the memory device may set an alarm latch at 515. For example, the memory device may generate signaling indicative of an alarm based on detecting a fault that is associated with the memory device. Setting the alarm latch or otherwise generating the signaling indicative of the alarm may be performed using one or more techniques. For example, the memory device may perform any process to store an indication that a fault was detected at 510. In some examples, the memory device may track a quantity of faults detected within a specific time window. The memory device may maintain the indication to apply the delay to the procedure to boot up the memory device (e.g., by setting the alarm latch) if the memory device detects a quantity of faults associated with the memory device during a duration that exceeds a threshold.

At 520, the memory device may initiate a power down procedure. For example, the memory device may receive a power down command from a host device coupled with the memory device, or the memory device may initiate the power down procedure for some other reason. The memory device may perform a first procedure to power down the memory device. At 525, the memory device may determine whether the alarm latch is set, for example, as part of the power down procedure. If the alarm latch is set, the memory device may refrain from modifying the indication to apply the delay. For example, the memory device may maintain the indication based on detecting, at 510, that a fault is associated with the memory device. In some examples, maintaining the indication may involve refraining from changing a bit value of the bit in the non-volatile memory (e.g., the penalty bit) or refraining from discharging the capacitor. However, if the alarm latch is not set (e.g., indicating that a fault was not detected at 510), at 530, the memory device may modify the indication to apply the delay. For example, the memory device may set the bit in the non-volatile memory to a second bit value (e.g., set the penalty bit to "False") or the memory device may discharge the capacitor. In some cases, the memory device may tune the discharging of the capacitor (e.g., a duration configured for discharging the capacitor below a charge threshold) based on a duration of the delay to apply during boot up, based on a quantity of faults detected as associated with the memory device, or based on both. The memory device may complete the power down procedure based on modifying the indication to apply the delay during boot up or determining not to modify the indication to apply the delay during boot up.

At 535, the memory device may initiate a boot up procedure. For example, the memory device may receive a boot up command (e.g., from a host device). The memory device may perform a second procedure to boot up the memory device based on performing the first procedure to power down the memory device.

At 540, the memory device may determine whether the indication is set to apply the delay to the procedure to boot up the memory device. For example, the memory device may determine whether the penalty bit is set to a given value or status, such as "True." In some examples, the memory device may read the bit value of the bit in the non-volatile memory (e.g., the penalty bit) during the procedure to boot up the memory device to determine whether to apply the delay to the boot up procedure. Additionally or alternatively, the memory device may check whether the capacitor is charged. If the penalty bit is set to a value or status, such as "False," or the capacitor is discharged, at 545, the memory device may perform a normal boot up procedure. That is, the memory device may refrain from applying a delay to the procedure to boot up the memory device based on the memory device not storing an indication to apply the delay (e.g., based on the bit value of the bit in the non-volatile memory (e.g., the penalty bit) being the second bit value or the capacitor being discharged). If the penalty bit is set to "True" or the capacitor is charged (e.g., holds a level of charge above a charge threshold), at 550, the memory device may apply a start-up penalty to the boot up procedure. For example, the memory device may apply the delay to the second procedure to boot up the memory device based on the indication being set. The memory device may apply the delay if the bit value of the bit in the non-volatile memory is set to the first bit value or the capacitor includes a charge over the charge threshold. The delay may be based on a configured delay value stored at the memory device. For example, the memory device may write, to non-volatile memory, data indicative of a duration of the delay and may apply the delay based on the duration of the delay.

In some examples, the memory device may perform one or more corrective or protective actions during boot up of the memory device (e.g., during the applied delay or at another time during the boot up procedure). For example, the memory device may write one or more values to one or more capacitive storage elements of the memory device during the procedure to boot up the memory device based on detecting that the fault was injected into the memory device. The one or more capacitive storage elements may be configured for erasure upon boot up based on the fault being detected. For example, the one or more capacitive storage elements may be specific storage elements configured for securing sensitive data. The memory device may write data, received from a host device and associated with a security protocol (e.g., a security protocol defining that the associated data should be secured and erased if a fault is detected), to at least one of the one or more capacitive storage elements configured for erasure upon boot up based on the fault being detected and based on the security protocol.

Following the delay, the memory device may complete the boot up procedure. As part of completing the boot up procedure, or upon completing the boot up procedure, the memory device may again set the indication to apply the delay to the boot up procedure at 505.

Figure 6:
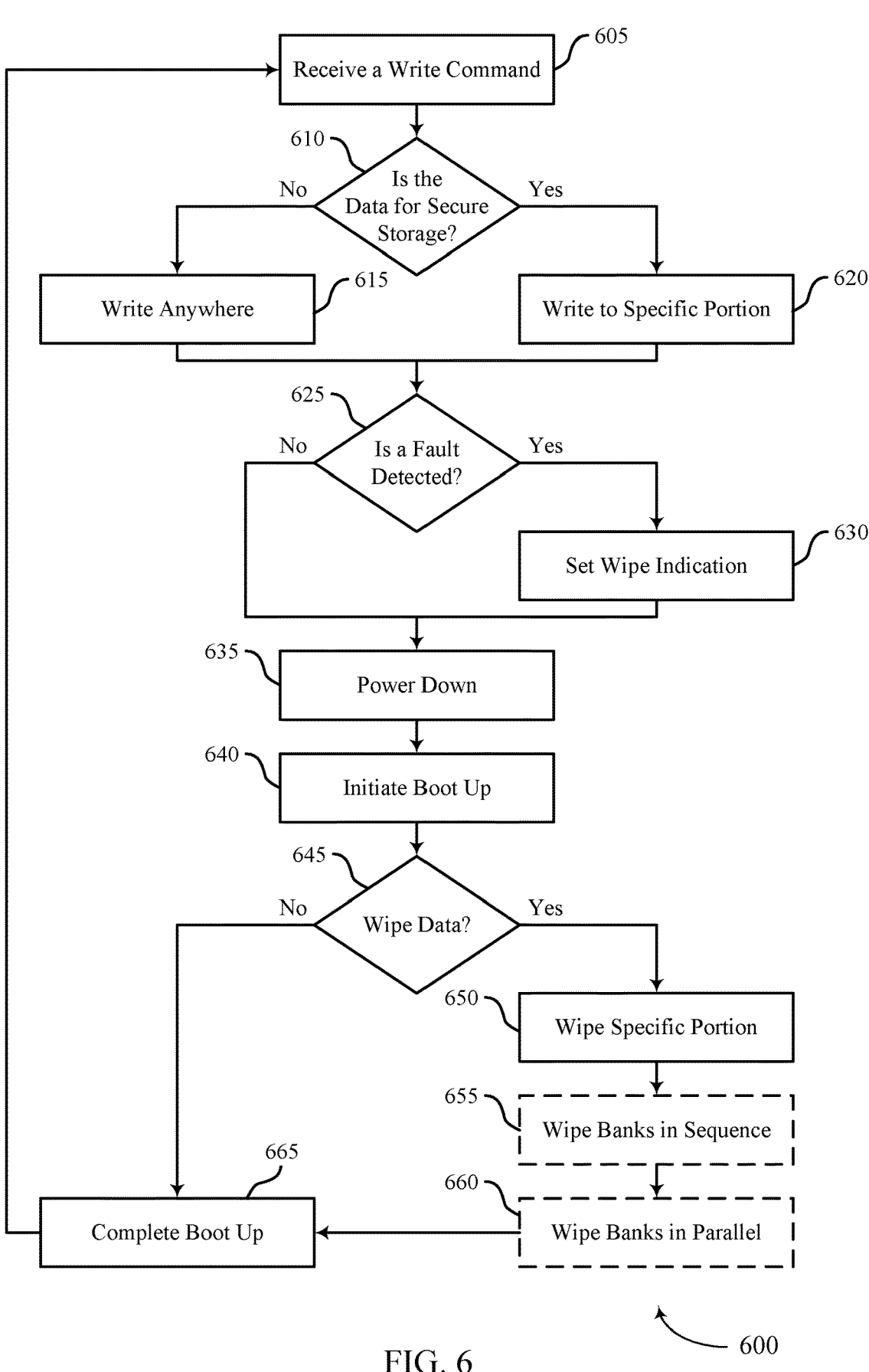

FIG. 6 illustrates an example of a process flow 600 that supports protective actions for a memory device based on detecting an attack in accordance with examples as disclosed herein. The process flow 600 may be performed by devices described with reference to FIGS. 1 through 4. For example, a memory device—such as a memory device 110—may perform one or more aspects of the process flow 600. In some examples, the memory device may be associated with (e.g., a component of) a vehicle. The memory device may include—or be an example of—a DRAM. The process flow 600 may support erasing data from the memory device according to one or more techniques, as described with reference to FIG. 3. For example, the memory device may include a portion of memory dedicated to secure information that may be erased during boot up if a fault is detected at the memory device. Alternative examples of the following may be implemented, where some steps are performed in a different order or not at all. Additionally, some steps may include additional features not mentioned below.

Aspects of the process flow 600 may be implemented by a controller, among other components (e.g., a memory device controller). Additionally or alternatively, aspects of the process flow 600 may be implemented by logic coupled with a memory device. For example, the logic may be operable to cause an apparatus to perform the operations of the process flow 600.

At 605, the memory device may receive a write command. For example, the memory device may receive, from a host device, signaling indicative of a write command for data. In some cases, the data may be associated with a security protocol.

At 610, the memory device may determine whether the data is for secure storage. For example, the memory device may direct the data to be stored in secure storage if the data is associated with a security protocol. Data associated with a security protocol may include CSPs, among other sensitive information. If the data is not for secure storage (e.g., the data is not associated with a security protocol), at 615, the memory device may write the data anywhere in memory. That is, the memory device may perform a normal write procedure, such as using a normal addressing scheme to write the data to next available memory resources within the memory device. However, if the data is for secure storage (e.g., the data is associated with a security protocol), at 620, the memory device may write the data to a specific portion of the memory device, as described herein with reference to FIG. 3. For example, the memory device may write the data associated with the security protocol to at least one of a set of capacitive storage elements configured for erasure upon boot up based on a fault being detected. The writing may be in response to the write command and based on the security protocol, such that this data will be erased during boot up if a fault is detected based on where the data is written within the memory device (e.g., which capacitive storage elements store the data).

At 625, the memory device may determine whether a fault is detected for the memory device. In some cases, the memory device may perform fault detection as described herein with reference to FIGS. 2 and 5. If a fault is not detected, the memory device may refrain from indicating to wipe the DRAM. If a fault is detected, at 630, the memory device may set a wipe indication for the DRAM. For example, the memory device may detect a fault that is injected into the memory device. The memory device may set the wipe indication by setting an alarm latch, updating a penalty bit, or performing some other function to indicate to erase sensitive data during a next boot up procedure.

At 635, the memory device may perform a procedure to power down the memory device. For example, the memory device may receive a power down command from a host device and may enter a low power state in response to the command. At 640, the memory device may initiate a boot up procedure, for example, in response to a boot up command received from the host device. The memory device may perform a procedure to boot up the memory device.

At 645, the memory device may determine whether to wipe data from the memory device, for example, based on whether a wipe indication is set. If the memory device detected a fault (e.g., one fault, a quantity of faults exceeding a threshold within a time window), the memory device may wipe data from the memory device. If not (e.g., if the wipe indication is not set), the memory device may complete the procedure to boot up the memory device at 665 without wiping data from memory.

If the memory device determines to wipe data from memory, at 650, the memory device may wipe data from a specific portion of the DRAM. For example, the memory device may write one or more values to one or more capacitive storage elements of the memory device during the procedure to boot up the memory device. The one or more values may be default values or random values used to remove the data previously stored in these capacitive storage elements, effectively erasing the previously stored data. The memory device may perform the erasure based on detecting that a fault was injected into the memory device. The one or more capacitive storage elements may be configured for erasure upon boot up based on the fault being detected. That is, the memory device may include a specific set of memory resources (e.g., the one or more capacitive storage elements) that are configured to guarantee erasure during boot up if a fault is detected by the memory device. Other memory resources of the memory device may or may not be erased during boot up if the fault is detected depending on an amount of time resources, processing resources, or both available for performing erasure operations by the memory device during boot up. In some cases, the one or more capacitive storage elements may correspond to a subset of each row of capacitive storage elements at the memory device, a subset of each bank of capacitive storage elements at the memory device, a subset of rows of capacitive storage elements at the memory device, a range of addresses of capacitive storage elements at the memory device, or some combination thereof. The one or more capacitive storage elements may include a subset of all of the capacitive storage elements of the memory device, and a quantity of the capacitive storage elements in the subset may be based on a duration of the procedure to boot up the memory device.

In some examples, at 655, the memory device may wipe data in sequence. For example, the memory device may send signaling indicative of one or more commands to one or more banks including the one or more capacitive storage elements of the memory device and may execute the one or more commands at the one or more banks in sequence. Alternatively, at 660, the memory device may wipe data in parallel. For example, the memory device may send signaling indicative of one or more commands to one or more banks including the one or more capacitive storage elements of the memory device and may execute the one or more commands at the one or more banks in parallel. Executing the one or more commands may cause the one or more values (e.g., values of zero) to be written to the one or more capacitive storage elements. In some cases, executing the commands in parallel across the memory banks may allow the memory device to wipe all capacitive storage elements of the memory device (i.e., the one or more capacitive storage elements may include all capacitive storage elements of the memory device). The memory device may complete the procedure to boot up the memory device at 665 following wiping data from the one or more capacitive storage elements.

Figure 7:
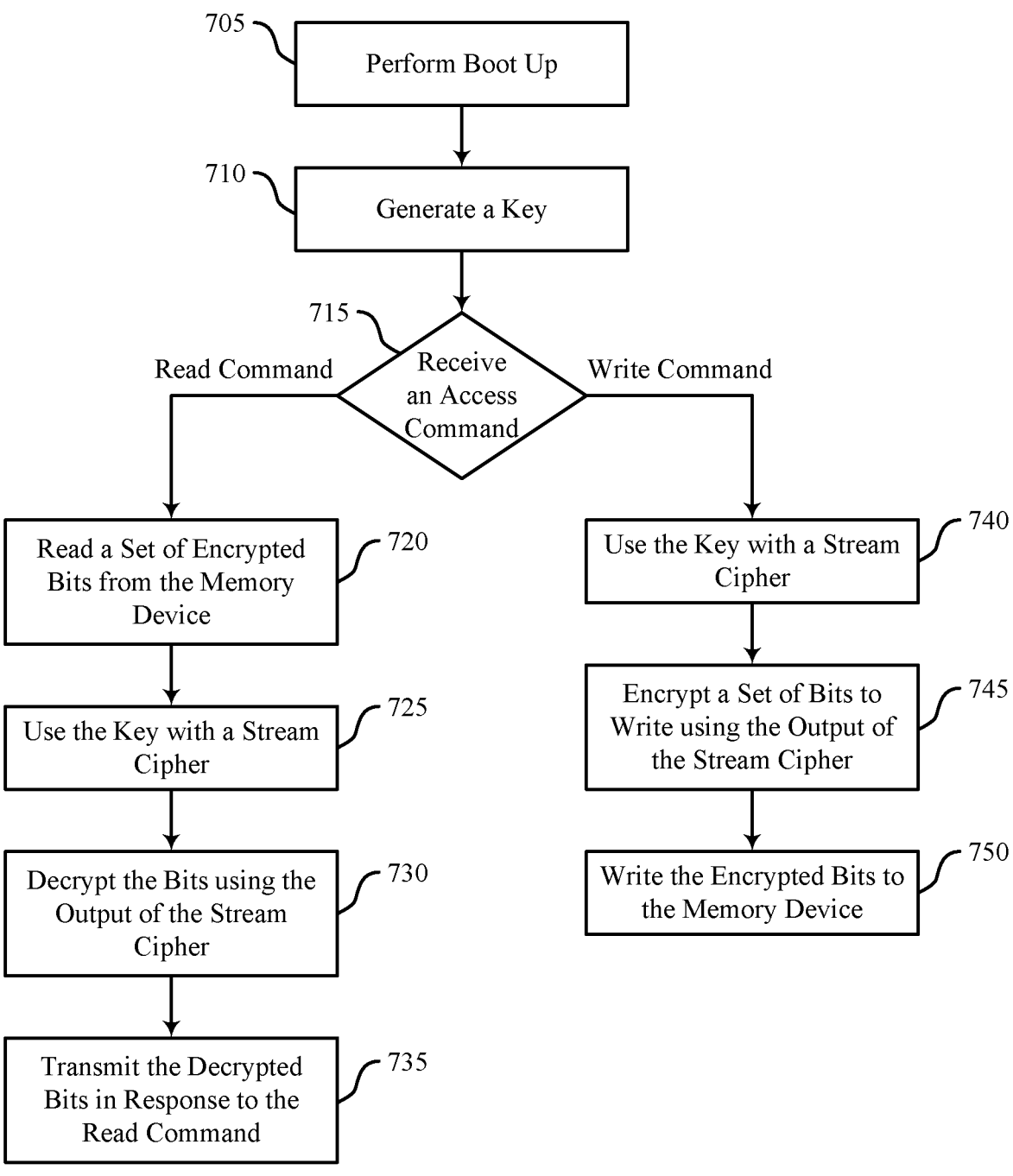

FIG. 7 illustrates an example of a process flow 700 that supports protective actions for a memory device based on detecting an attack in accordance with examples as disclosed herein. The process flow 700 may be performed by devices described with reference to FIGS. 1 through 4. For example, a memory device—such as a memory device 110—may perform one or more aspects of the process flow 700. In some examples, the memory device may be associated with (e.g., a component of) a vehicle. The memory device may include—or be an example of—a DRAM. The process flow 700 may support encryption techniques using a stream cipher, as described with reference to FIG. 4. Alternative examples of the following may be implemented, where some steps are performed in a different order or not at all. Additionally, some steps may include additional features not mentioned below.

Aspects of the process flow 700 may be implemented by a controller, among other components (e.g., a memory device controller). Additionally or alternatively, aspects of the process flow 700 may be implemented by logic coupled with a memory device. For example, the logic may be operable to cause an apparatus to perform the operations of the process flow 700.

At 705, the memory device may perform a first procedure to boot up the memory device. For example, the memory device may receive, from a host device, a command to boot up the memory device.

At 710, the memory device may generate a key. The memory device may generate the key based on the procedure to boot up the memory device. For example, the memory device may generate the key during boot up or after boot up. The key may be an example of a randomly generated or pseudo-randomly generated key generated based on a function for random number generation.

At 715, the memory device may receive an access command. For example, the memory device may receive, from a host device, signaling indicative of a command for accessing a set of data, the command associated with an address (e.g., an address within the DRAM of the memory device). The memory device may perform a second procedure associated with encryption for the set of data based on the key, the address, and a stream cipher configured at the memory device.

If the access command is a read command, at 720, the memory device may read a set of encrypted bits from the memory device at the indicated address. For example, the memory device may read a set of bits from one or more capacitive storage elements of the memory device based on the command for accessing the set of data including a command for reading the set of data. The set of bits may be encrypted bits, and the one or more capacitive storage elements may correspond to the address associated with the command. At 725, the memory device may use the key generated at 710 with a stream cipher to determine a keystream, as described with reference to FIG. 4. For example, the memory device may input a value to the stream cipher to obtain an output of the stream cipher, where the value is based on the key and the address (e.g., according to an XOR operation). At 730, the memory device may decrypt the set of encrypted bits using the output of the stream cipher. For example, the memory device may perform an XOR operation on the set of bits read from the one or more capacitive storage elements and the output of the stream cipher to obtain the set of data. At 735, the memory device may transmit the decrypted bits in response to the read command. For example, the memory device may transmit, to the host device, second signaling indicative of the set of data in response to the command for reading the set of data.

If the access command is a write command, at 740, the memory device may use the key generated at 710 with a stream cipher to determine a keystream, as described with reference to FIG. 4. For example, the memory device may input a value to the stream cipher to obtain an output of the stream cipher, where the value is based on the key and the address (e.g., combined using an XOR operation or other operation). At 745, the memory device may encrypt a set of bits to write using the output of the stream cipher. For example, the memory device may perform an XOR operation on the set of data and the output of the stream cipher to obtain a set of bits encrypted using the stream cipher. The set of data may be indicated by the access command, where the command for accessing the set of data includes a command for writing the set of data (e.g., to memory of the memory device). At 750, the memory device may write the encrypted bits to the memory device. For example, the memory device may write the set of bits to one or more capacitive storage elements of the memory device (e.g., corresponding to the address associated with the command) based on the command being a write command.

Figure 8:
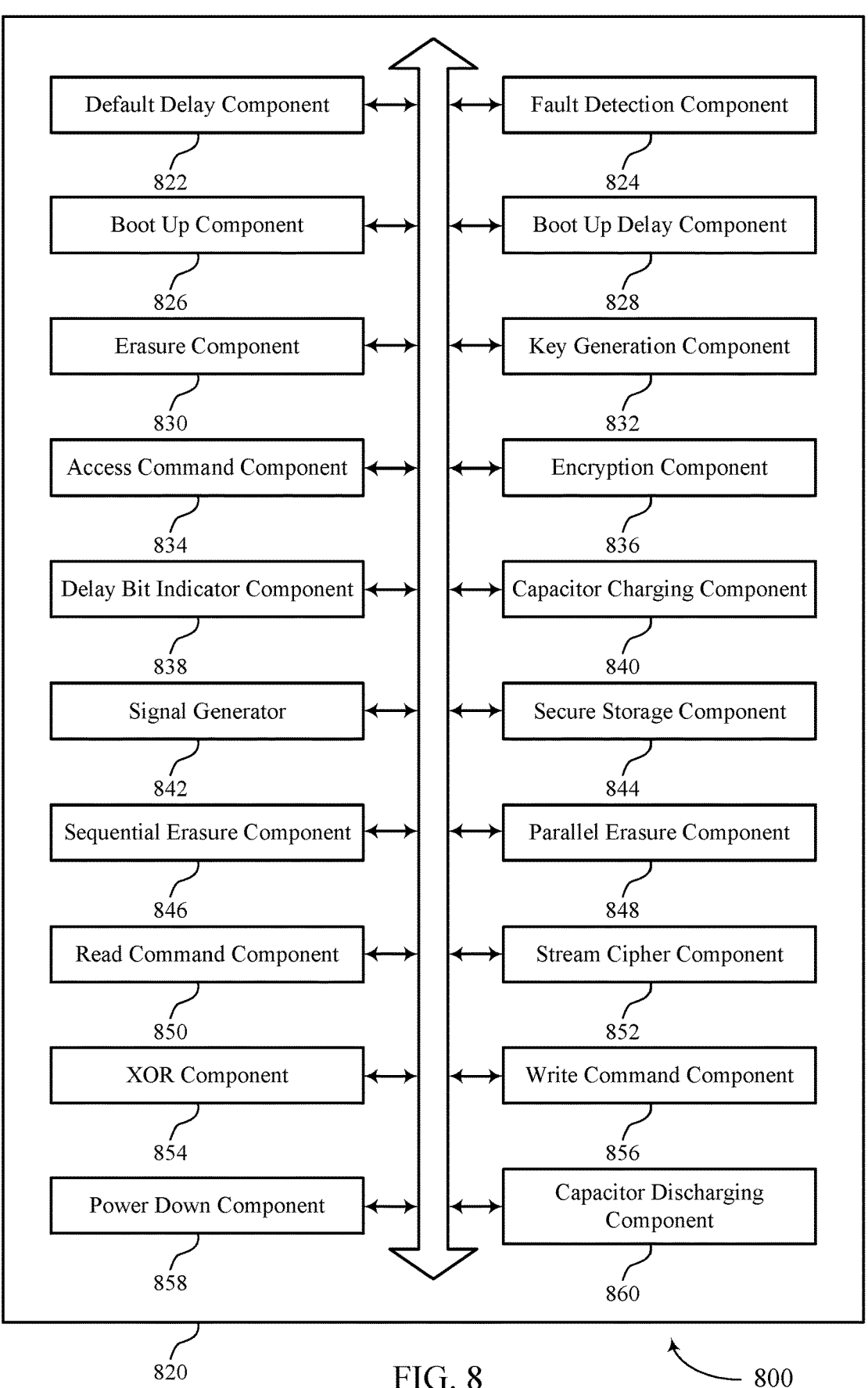
FIG. 8 shows a block diagram of a memory device that supports protective actions for a memory device based on detecting an attack in accordance with examples as disclosed herein.

FIG. 8 shows a block diagram 800 of a memory device 820 that supports protective actions for a memory device based on detecting an attack in accordance with examples as disclosed herein. The memory device 820 may be an example of aspects of a memory device as described with reference to FIGS. 1 through 7. The memory device 820, or various components thereof, may be an example of means for performing various aspects of protective actions for a memory device based on detecting an attack as described herein. For example, the memory device 820 may include a default delay component 822, a fault detection component 824, a boot up component 826, a boot up delay component 828, an erasure component 830, a key generation component 832, an access command component 834, an encryption component 836, a delay bit indicator component 838, a capacitor charging component 840, a signal generator 842, a secure storage component 844, a sequential erasure component 846, a parallel erasure component 848, a read command component 850, a stream cipher component 852, an XOR component 854, a write command component 856, a power down component 858, a capacitor discharging component 860, or any combination thereof. Each of these components may communicate, directly or indirectly, with one another (e.g., via one or more buses).

The default delay component 822 may be configured as or otherwise support a means for setting an indication to apply a delay to a procedure to boot up a memory device. The fault detection component 824 may be configured as or otherwise support a means for performing a first procedure to power down the memory device, where the indication is maintained based at least in part on detecting that a fault is associated with the memory device. The boot up component 826 may be configured as or otherwise support a means for performing a second procedure to boot up the memory device based at least in part on performing the first procedure to power down the memory device. The boot up delay component 828 may be configured as or otherwise support a means for applying the delay to the second procedure to boot up the memory device based at least in part on the indication being set.

In some examples, the delay bit indicator component 838 may be configured as or otherwise support a means for writing a first bit value to a bit in non-volatile memory during the second procedure to boot up the memory device, where the bit with the first bit value in the non-volatile memory includes the indication to apply the delay.

In some examples, the delay bit indicator component 838 may be configured as or otherwise support a means for reading a bit value of the bit in the non-volatile memory during the second procedure to boot up the memory device, where the delay is applied to the second procedure to boot up the memory device based at least in part on the bit value of the bit in the non-volatile memory being the first bit value.

In some examples, the fault detection component 824 may be configured as or otherwise support a means for failing to detect that a second fault is associated with the memory device after completing the second procedure to boot up the memory device. In some examples, the delay bit indicator component 838 may be configured as or otherwise support a means for writing a second bit value to a bit in non-volatile memory based at least in part on failing to detect that the second fault is associated with the memory device.

In some examples, the power down component 858 may be configured as or otherwise support a means for performing a third procedure to power down the memory device after writing the second bit value to the bit in the non-volatile memory. In some examples, the boot up component 826 may be configured as or otherwise support a means for performing a fourth procedure to boot up the memory device based at least in part on performing the third procedure to power down the memory device. In some examples, the boot up component 826 may be configured as or otherwise support a means for refraining from applying the delay to the fourth procedure to boot up the memory device based at least in part on a bit value of the bit in the non-volatile memory being the second bit value.

In some examples, the capacitor charging component 840 may be configured as or otherwise support a means for charging a capacitor during the second procedure to boot up the memory device, where the capacitor includes the indication to apply the delay. In some examples, the delay is applied to the second procedure to boot up the memory device based at least in part on determining that the capacitor is charged during the second procedure to boot up the memory device.

In some examples, the fault detection component 824 may be configured as or otherwise support a means for failing to detect that a second fault is associated with the memory device after completing the second procedure to boot up the memory device. In some examples, the capacitor discharging component 860 may be configured as or otherwise support a means for discharging the capacitor based at least in part on failing to detect that the second fault is associated with the memory device.

In some examples, the capacitor discharging component 860 may be configured as or otherwise support a means for tuning the discharging of the capacitor based at least in part on a duration of the delay, a quantity of faults detected as associated with the memory device, or both.

In some examples, the signal generator 842 may be configured as or otherwise support a means for generating signaling indicative of an alarm based at least in part on detecting that the fault is associated with the memory device, where the indication is maintained based at least in part on the signaling indicative of the alarm.

In some examples, the fault detection component 824 may be configured as or otherwise support a means for detecting that a quantity of faults associated with the memory device during a duration exceeds a threshold, where the indication is maintained based at least in part on the quantity of faults for the duration exceeding the threshold.

In some examples, the boot up delay component 828 may be configured as or otherwise support a means for writing, to non-volatile memory, data indicative of a duration of the delay, where applying the delay is based at least in part on the duration of the delay.

In some examples, the fault detection component 824 may be configured as or otherwise support a means for detecting that a fault is injected into a memory device. In some examples, the boot up component 826 may be configured as or otherwise support a means for performing a procedure to boot up the memory device. The erasure component 830 may be configured as or otherwise support a means for writing one or more values to one or more capacitive storage elements of the memory device during the procedure to boot up the memory device based at least in part on detecting that the fault is injected into the memory device, the one or more capacitive storage elements configured for erasure upon boot up based at least in part on the fault being detected.

In some examples, the secure storage component 844 may be configured as or otherwise support a means for receiving, from a host device, signaling indicative of a write command for data associated with a security protocol. In some examples, the secure storage component 844 may be configured as or otherwise support a means for writing the data associated with the security protocol to at least one of the one or more capacitive storage elements configured for erasure upon boot up based at least in part on the fault being detected, where writing the data is in response to the write command and is based at least in part on the security protocol.

In some examples, the sequential erasure component 846 may be configured as or otherwise support a means for sending signaling indicative of one or more commands to one or more banks including the one or more capacitive storage elements of the memory device. In some examples, the sequential erasure component 846 may be configured as or otherwise support a means for executing the one or more commands at the one or more banks in sequence, where the one or more values are written to the one or more capacitive storage elements based at least in part on executing the one or more commands.

In some examples, the parallel erasure component 848 may be configured as or otherwise support a means for sending signaling indicative of one or more commands to one or more banks including the one or more capacitive storage elements of the memory device. In some examples, the parallel erasure component 848 may be configured as or otherwise support a means for executing the one or more commands at the one or more banks in parallel, where the one or more values are written to the one or more capacitive storage elements based at least in part on executing the one or more commands. In some examples, the one or more capacitive storage elements include all capacitive storage elements of the memory device based at least in part on executing the one or more commands at the one or more banks in parallel.

In some examples, the one or more capacitive storage elements correspond to a subset of each row of capacitive storage elements at the memory device, a subset of each bank of capacitive storage elements at the memory device, a subset of rows of capacitive storage elements at the memory device, a range of addresses of capacitive storage elements at the memory device, or a combination thereof. In some examples, the one or more capacitive storage elements include a subset of a plurality of capacitive storage elements of the memory device. In some examples, a quantity of capacitive storage elements in the subset is based at least in part on a duration of the procedure to boot up the memory device.

In some examples, the boot up component 826 may be configured as or otherwise support a means for performing a first procedure to boot up a memory device. The key generation component 832 may be configured as or otherwise support a means for generating a key based at least in part on the first procedure to boot up the memory device. The access command component 834 may be configured as or otherwise support a means for receiving, from a host device, signaling indicative of a command for accessing a set of data, the command associated with an address. The encryption component 836 may be configured as or otherwise support a means for performing a second procedure associated with encryption for the set of data based at least in part on the key, the address, and a stream cipher configured at the memory device.

In some examples, the read command component 850 may be configured as or otherwise support a means for reading a set of bits from one or more capacitive storage elements of the memory device based at least in part on the command for accessing the set of data including a command for reading the set of data, where the set of bits is encrypted. In some examples, the stream cipher component 852 may be configured as or otherwise support a means for inputting a value to the stream cipher to obtain an output of the stream cipher, where the value is based at least in part on the key and the address. In some examples, the XOR component 854 may be configured as or otherwise support a means for performing an XOR operation on the set of bits read from the one or more capacitive storage elements and the output of the stream cipher to obtain the set of data.

In some examples, the read command component 850 may be configured as or otherwise support a means for transmitting, to the host device, second signaling indicative of the set of data in response to the command for reading the set of data.

In some examples, the stream cipher component 852 may be configured as or otherwise support a means for inputting a value to the stream cipher to obtain an output of the stream cipher, where the value is based at least in part on the key and the address. In some examples, the XOR component 854 may be configured as or otherwise support a means for performing an XOR operation on the set of data and the output of the stream cipher to obtain a set of bits encrypted using the stream cipher. In some examples, the write command component 856 may be configured as or otherwise support a means for writing the set of bits to one or more capacitive storage elements of the memory device based at least in part on the command for accessing the set of data including a command for writing the set of data.

In some examples, the key is generated based at least in part on a function for random number generation.

FIG. 9 shows a flowchart illustrating a method 900 that supports protective actions for a memory device based on detecting an attack in accordance with examples as disclosed herein. The operations of method 900 may be implemented by a memory device or its components as described herein. For example, the operations of method 900 may be performed by a memory device as described with reference to FIGS. 1 through 8. In some examples, a memory device may execute a set of instructions to control the functional elements of the device to perform the described functions. Additionally or alternatively, the memory device may perform aspects of the described functions using special-purpose hardware.

At 905, the method may include setting an indication to apply a delay to a procedure to boot up a memory device. The operations of 905 may be performed in accordance with examples as disclosed herein. In some examples, aspects of the operations of 905 may be performed by a default delay component 822 as described with reference to FIG. 8.

At 910, the method may include performing a first procedure to power down the memory device, where the indication is maintained based at least in part on detecting that a fault is associated with the memory device. The operations of 910 may be performed in accordance with examples as disclosed herein. In some examples, aspects of the operations of 910 may be performed by a fault detection component 824 as described with reference to FIG. 8.

At 915, the method may include performing a second procedure to boot up the memory device based at least in part on performing the first procedure to power down the memory device. The operations of 915 may be performed in accordance with examples as disclosed herein. In some examples, aspects of the operations of 915 may be performed by a boot up component 826 as described with reference to FIG. 8.

At 920, the method may include applying the delay to the second procedure to boot up the memory device based at least in part on the indication being set. The operations of 920 may be performed in accordance with examples as disclosed herein. In some examples, aspects of the operations of 920 may be performed by a boot up delay component 828 as described with reference to FIG. 8.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, cir-cuitry, logic, means, or instructions, or any combination thereof for setting an indication to apply a delay to a procedure to boot up a memory device; performing a first procedure to power down the memory device, where the indication is maintained based at least in part on detecting that a fault is associated with the memory device; performing a second procedure to boot up the memory device based at least in part on performing the first procedure to power down the memory device; and applying the delay to the second procedure to boot up the memory device based at least in part on the indication being set.

Aspect 2: The method, apparatus, or non-transitory computer-readable medium of aspect 1, further including operations, features, circuitry, logic, means, or instructions, or any combination thereof for writing a first bit value to a bit in non-volatile memory during the second procedure to boot up the memory device, where the bit with the first bit value in the non-volatile memory includes the indication to apply the delay.

Aspect 3: The method, apparatus, or non-transitory computer-readable medium of aspect 2, further including operations, features, circuitry, logic, means, or instructions, or any combination thereof for reading a bit value of the bit in the non-volatile memory during the second procedure to boot up the memory device, where the delay is applied to the second procedure to boot up the memory device based at least in part on the bit value of the bit in the non-volatile memory being the first bit value.

Aspect 4: The method, apparatus, or non-transitory computer-readable medium of any of aspects 1 through 3, further including operations, features, circuitry, logic, means, or instructions, or any combination thereof for failing to detect that a second fault is associated with the memory device after completing the second procedure to boot up the memory device and writing a second bit value to a bit in non-volatile memory based at least in part on failing to detect that the second fault is associated with the memory device.

Aspect 5: The method, apparatus, or non-transitory computer-readable medium of aspect 4, further including operations, features, circuitry, logic, means, or instructions, or any combination thereof for performing a third procedure to power down the memory device after writing the second bit value to the bit in the non-volatile memory; performing a fourth procedure to boot up the memory device based at least in part on performing the third procedure to power down the memory device; and refraining from applying the delay to the fourth procedure to boot up the memory device based at least in part on a bit value of the bit in the non-volatile memory being the second bit value.

Aspect 6: The method, apparatus, or non-transitory computer-readable medium of any of aspects 1 through 5, further including operations, features, circuitry, logic, means, or instructions, or any combination thereof for charging a capacitor during the second procedure to boot up the memory device, where the capacitor includes the indication to apply the delay.

Aspect 7: The method, apparatus, or non-transitory computer-readable medium of aspect 6 where the delay is applied to the second procedure to boot up the memory device based at least in part on determining that the capacitor is charged during the second procedure to boot up the memory device.

Aspect 8: The method, apparatus, or non-transitory computer-readable medium of any of aspects 6 through 7, further including operations, features, circuitry, logic, means, or instructions, or any combination thereof for failing to detect that a second fault is associated with the memory device after completing the second procedure to boot up the memory device and discharging the capacitor based at least in part on failing to detect that the second fault is associated with the memory device.

Aspect 9: The method, apparatus, or non-transitory computer-readable medium of aspect 8, further including operations, features, circuitry, logic, means, or instructions, or any combination thereof for tuning the discharging of the capacitor based at least in part on a duration of the delay, a quantity of faults detected as associated with the memory device, or both.

Aspect 10: The method, apparatus, or non-transitory computer-readable medium of any of aspects 1 through 9, further including operations, features, circuitry, logic, means, or instructions, or any combination thereof for generating signaling indicative of an alarm based at least in part on detecting that the fault is associated with the memory device, where the indication is maintained based at least in part on the signaling indicative of the alarm.

Aspect 11: The method, apparatus, or non-transitory computer-readable medium of any of aspects 1 through 10, further including operations, features, circuitry, logic, means, or instructions, or any combination thereof for detecting that a quantity of faults associated with the memory device during a duration exceeds a threshold, where the indication is maintained based at least in part on the quantity of faults for the duration exceeding the threshold.

Aspect 12: The method, apparatus, or non-transitory computer-readable medium of any of aspects 1 through 11, further including operations, features, circuitry, logic, means, or instructions, or any combination thereof for writing, to non-volatile memory, data indicative of a duration of the delay, where applying the delay is based at least in part on the duration of the delay.

FIG. 10 shows a flowchart illustrating a method 1000 that supports protective actions for a memory device based on detecting an attack in accordance with examples as disclosed herein. The operations of method 1000 may be implemented by a memory device or its components as described herein. For example, the operations of method 1000 may be performed by a memory device as described with reference to FIGS. 1 through 8. In some examples, a memory device may execute a set of instructions to control the functional elements of the device to perform the described functions. Additionally or alternatively, the memory device may perform aspects of the described functions using special-purpose hardware.

At 1005, the method may include detecting that a fault is injected into a memory device. The operations of 1005 may be performed in accordance with examples as disclosed herein. In some examples, aspects of the operations of 1005 may be performed by a fault detection component 824 as described with reference to FIG. 8.

At 1010, the method may include performing a procedure to boot up the memory device. The operations of 1010 may be performed in accordance with examples as disclosed herein. In some examples, aspects of the operations of 1010 may be performed by a boot up component 826 as described with reference to FIG. 8.

At 1015, the method may include writing one or more values to one or more capacitive storage elements of the memory device during the procedure to boot up the memory device based at least in part on detecting that the fault is injected into the memory device, the one or more capacitive storage elements configured for erasure upon boot up based at least in part on the fault being detected. The operations of 1015 may be performed in accordance with examples as disclosed herein. In some examples, aspects of the operations of 1015 may be performed by an erasure component 830 as described with reference to FIG. 8.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 13: A method, apparatus, or non-transitory computer-readable medium including operations, features, circuitry, logic, means, or instructions, or any combination thereof for detecting that a fault is injected into a memory device; performing a procedure to boot up the memory device; and writing one or more values to one or more capacitive storage elements of the memory device during the procedure to boot up the memory device based at least in part on detecting that the fault is injected into the memory device, the one or more capacitive storage elements configured for erasure upon boot up based at least in part on the fault being detected.

Aspect 14: The method, apparatus, or non-transitory computer-readable medium of aspect 13, further including operations, features, circuitry, logic, means, or instructions, or any combination thereof for receiving, from a host device, signaling indicative of a write command for data associated with a security protocol and writing the data associated with the security protocol to at least one of the one or more capacitive storage elements configured for erasure upon boot up based at least in part on the fault being detected, where writing the data is in response to the write command and is based at least in part on the security protocol.

Aspect 15: The method, apparatus, or non-transitory computer-readable medium of any of aspects 13 through 14, further including operations, features, circuitry, logic, means, or instructions, or any combination thereof for sending signaling indicative of one or more commands to one or more banks including the one or more capacitive storage elements of the memory device and executing the one or more commands at the one or more banks in sequence, where the one or more values are written to the one or more capacitive storage elements based at least in part on executing the one or more commands.

Aspect 16: The method, apparatus, or non-transitory computer-readable medium of any of aspects 13 through 14, further including operations, features, circuitry, logic, means, or instructions, or any combination thereof for sending signaling indicative of one or more commands to one or more banks including the one or more capacitive storage elements of the memory device and executing the one or more commands at the one or more banks in parallel, where the one or more values are written to the one or more capacitive storage elements based at least in part on executing the one or more commands.

Aspect 17: The method, apparatus, or non-transitory computer-readable medium of aspect 16 where the one or more capacitive storage elements include all capacitive storage elements of the memory device based at least in part on executing the one or more commands at the one or more banks in parallel.

Aspect 18: The method, apparatus, or non-transitory computer-readable medium of any of aspects 13 through 16 where the one or more capacitive storage elements correspond to a subset of each row of capacitive storage elements at the memory device, a subset of each bank of capacitive storage elements at the memory device, a subset of rows of capacitive storage elements at the memory device, a range of addresses of capacitive storage elements at the memory device, or a combination thereof.

Aspect 19: The method, apparatus, or non-transitory computer-readable medium of any of aspects 13 through 18 where the one or more capacitive storage elements include a subset of a plurality of capacitive storage elements of the memory device and a quantity of capacitive storage elements in the subset is based at least in part on a duration of the procedure to boot up the memory device.

FIG. 11 shows a flowchart illustrating a method 1100 that supports protective actions for a memory device based on detecting an attack in accordance with examples as disclosed herein. The operations of method 1100 may be implemented by a memory device or its components as described herein. For example, the operations of method 1100 may be performed by a memory device as described with reference to FIGS. 1 through 8. In some examples, a memory device may execute a set of instructions to control the functional elements of the device to perform the described functions. Additionally or alternatively, the memory device may perform aspects of the described functions using special-purpose hardware.

At 1105, the method may include performing a first procedure to boot up a memory device. The operations of 1105 may be performed in accordance with examples as disclosed herein. In some examples, aspects of the operations of 1105 may be performed by a boot up component 826 as described with reference to FIG. 8.

At 1110, the method may include generating a key based at least in part on the first procedure to boot up the memory device. The operations of 1110 may be performed in accordance with examples as disclosed herein. In some examples, aspects of the operations of 1110 may be performed by a key generation component 832 as described with reference to FIG. 8.

At 1115, the method may include receiving, from a host device, signaling indicative of a command for accessing a set of data, the command associated with an address. The operations of 1115 may be performed in accordance with examples as disclosed herein. In some examples, aspects of the operations of 1115 may be performed by an access command component 834 as described with reference to FIG. 8.

At 1120, the method may include performing a second procedure associated with encryption for the set of data based at least in part on the key, the address, and a stream cipher configured at the memory device. The operations of 1120 may be performed in accordance with examples as disclosed herein. In some examples, aspects of the operations of 1120 may be performed by an encryption component 836 as described with reference to FIG. 8.

In some examples, an apparatus as described herein may perform a method or methods, such as the method 1100. The apparatus may include features, circuitry, logic, means, or instructions (e.g., a non-transitory computer-readable medium storing instructions executable by a processor), or any combination thereof for performing the following aspects of the present disclosure:

Aspect 20: A method, apparatus, or non-transitory computer-readable medium including operations, features, circuitry, logic, means, or instructions, or any combination thereof for performing a first procedure to boot up a memory device; generating a key based at least in part on the first procedure to boot up the memory device; receiving, from a host device, signaling indicative of a command for accessing a set of data, the command associated with an address; and performing a second procedure associated with encryption for the set of data based at least in part on the key, the address, and a stream cipher configured at the memory device.

Aspect 21: The method, apparatus, or non-transitory computer-readable medium of aspect 20, further including operations, features, circuitry, logic, means, or instructions, or any combination thereof for reading a set of bits from one or more capacitive storage elements of the memory device based at least in part on the command for accessing the set of data including a command for reading the set of data, where the set of bits are encrypted; inputting a value to the stream cipher to obtain an output of the stream cipher, where the value is based at least in part on the key and the address; and performing an exclusive or operation on the set of bits read from the one or more capacitive storage elements and the output of the stream cipher to obtain the set of data.

Aspect 22: The method, apparatus, or non-transitory computer-readable medium of aspect 21, further including operations, features, circuitry, logic, means, or instructions, or any combination thereof for transmitting, to the host device, second signaling indicative of the set of data in response to the command for reading the set of data.

Aspect 23: The method, apparatus, or non-transitory computer-readable medium of aspect 20, further including operations, features, circuitry, logic, means, or instructions, or any combination thereof for inputting a value to the stream cipher to obtain an output of the stream cipher, where the value is based at least in part on the key and the address; performing an exclusive or operation on the set of data and the output of the stream cipher to obtain a set of bits encrypted using the stream cipher; and writing the set of bits to one or more capacitive storage elements of the memory device based at least in part on the command for accessing the set of data including a command for writing the set of data.

Aspect 24: The method, apparatus, or non-transitory computer-readable medium of any of aspects 20 through 23 where the key is generated based at least in part on a function for random number generation.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "acti-vated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, a DSP, an ASIC, an FPGA, discrete gate logic, discrete transistor logic, discrete hardware components, other programmable logic device, or any combination thereof designed to perform the functions described herein. A processor may be an example of a microprocessor, controller, microcontroller, state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, EEPROM, compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
setting an indication to apply a delay of a first duration to a procedure to boot up a memory device;
performing a first procedure to power down the memory device;
detecting, while performing the first procedure, that a fault associated with the memory device has occurred, wherein the indication to apply the delay is maintained in accordance with detecting that the fault has occurred;
receive a command to perform a second procedure to boot up the memory device based at least in part on performing the first procedure to power down the memory device; and
applying, based at least in part on reception of the command and based at least in part on the indication being set, the delay of the first duration to an initiation of the second procedure to boot up the memory device.

2. The method of claim 1, further comprising:
writing a first bit value to a bit in non-volatile memory during the second procedure to boot up the memory device, wherein the bit with the first bit value in the non-volatile memory comprises the indication to apply the delay.

3. The method of claim 2, further comprising:
reading a bit value of the bit in the non-volatile memory during the second procedure to boot up the memory device, wherein the delay is applied to the second procedure to boot up the memory device based at least in part on the bit value of the bit in the non-volatile memory being the first bit value.

4. The method of claim 1, further comprising:
failing to detect that a second fault is associated with the memory device after completing the second procedure to boot up the memory device; and
writing a second bit value to a bit in non-volatile memory based at least in part on failing to detect that the second fault is associated with the memory device.

5. The method of claim 4, further comprising:
performing a third procedure to power down the memory device after writing the second bit value to the bit in the non-volatile memory;
performing a fourth procedure to boot up the memory device based at least in part on performing the third procedure to power down the memory device; and
refraining from applying the delay to the fourth procedure to boot up the memory device based at least in part on a bit value of the bit in the non-volatile memory being the second bit value.

6. The method of claim 1, further comprising:
charging a capacitor during the second procedure to boot up the memory device, wherein the capacitor comprises the indication to apply the delay.

7. The method of claim 6, wherein the delay is applied to the second procedure to boot up the memory device based at least in part on determining that the capacitor is charged during the second procedure to boot up the memory device.

8. The method of claim 6, further comprising:
failing to detect that a second fault is associated with the memory device after completing the second procedure to boot up the memory device; and
discharging the capacitor based at least in part on failing to detect that the second fault is associated with the memory device.

9. The method of claim 8, further comprising:
tuning the discharging of the capacitor based at least in part on a duration of the delay, a quantity of faults detected as associated with the memory device, or both.

10. The method of claim 1, further comprising:
generating signaling indicative of an alarm based at least in part on detecting that the fault is associated with the memory device, wherein the indication is maintained based at least in part on the signaling indicative of the alarm.

11. The method of claim 1, further comprising:
detecting that a quantity of faults associated with the memory device during a duration exceeds a threshold, wherein the indication is maintained based at least in part on the quantity of faults for the duration exceeding the threshold.

12. The method of claim 1, further comprising:
writing, to non-volatile memory, data indicative of a duration of the delay, wherein applying the delay is based at least in part on the duration of the delay.

* * * * *